United States Patent
Yagi et al.

(10) Patent No.: US 7,369,162 B2
(45) Date of Patent: May 6, 2008

(54) IMAGE SENSING APPARATUS

(75) Inventors: Tetsuya Yagi, Fukuoka (JP); Seiji Kameda, Osaka (JP)

(73) Assignee: Japan Science and Technology Agency (JP)

( * ) Notice: Subject to any disclaimer, the term of this patent is extended or adjusted under 35 U.S.C. 154(b) by 516 days.

(21) Appl. No.: 10/488,447

(22) PCT Filed: Sep. 3, 2002

(86) PCT No.: PCT/JP02/08915

§ 371 (c)(1),
(2), (4) Date: Nov. 9, 2004

(87) PCT Pub. No.: WO03/023712

PCT Pub. Date: Mar. 20, 2003

(65) Prior Publication Data

US 2005/0062853 A1 Mar. 24, 2005

(30) Foreign Application Priority Data

Sep. 5, 2001 (JP) ............................. 2001-269120

(51) Int. Cl.
- H04N 5/2228 (2006.01)
- G06K 9/00 (2006.01)
- G06K 9/40 (2006.01)
- G06K 7/00 (2006.01)

(52) U.S. Cl. .................. 348/222.1; 382/107; 382/254; 382/264; 382/312

(58) Field of Classification Search ...................... None
See application file for complete search history.

(56) References Cited

U.S. PATENT DOCUMENTS 5,187,581 A * 2/1993 Kamatani ................ 348/230.1
5,440,079 A * 8/1995 Mathur et al. ........... 178/18.05
6,362,482 B1 * 3/2002 Stettner et al. .......... 250/370.08
6,608,296 B1 * 8/2003 Toyoda et al. ........... 250/208.1
2002/0163491 A1 * 11/2002 Yoshimura et al. ........... 345/90
2003/0029989 A1 * 2/2003 Stettner et al. .......... 250/208.1

(Continued)

OTHER PUBLICATIONS

PCT Notification of Transmittal of Translation of the International Preliminary Examination Report for International Application No. PCT/JP02/08915 filed Sep. 3, 2002, International Publication No. WO 03/023712 A1 published Mar. 20, 2003.

(Continued)

*Primary Examiner*—Jingge Wu
*Assistant Examiner*—Max Shikhman
(74) *Attorney, Agent, or Firm*—Olson & Cepuritis, Ltd.; Thomas W. Tolpin

(57) ABSTRACT

An Image sensing apparatus employing a multi-chip system and having a super-parallel circuit structure capable of performing processes such as image processing in real time. A first chip of a first of a first stage has first pixel circuits each having an optical sensor and first processing circuits and arranged in a matrix. A second chip of a second stage has second pixel circuits each having an analog memory for storing analog information from the preceding stage and second processing circuits and arranged in a matrix so as to correspond to the first pixel circuits. In each of the first and the second chip, each of the first and the second processing circuits receives an analog signal from another first and second processing circuit in the vicinity so as to perform first and second analog processing and performs circuit noise compensation by parallel calculation.

7 Claims, 23 Drawing Sheets

CIRCUIT EXAMPLE OF MULTI-CHIP

OTHER PUBLICATIONS

Translation of the International Preliminary Report for International Application No. PCT/JP02/08915 filed Sep. 3, 2002, International Publication No. WO 03/023712 A1 published Mar. 20, 2003.

Publication: "*A Parallel Analog Intelligent Vision Sensor With A Variable Receptive Field*" by Tetsuya Yagi and Seiji Kameda of the Faculty of Computer Science and System Engineering, Kyushu Institute of Technology, Kawazee 600-4 Iizuka shi 820-8502, Japan and Kunihiko Iizuka of Information Technology Research Laboratories Sharp, 2613-1 Ichinomoto-cho, Tenri-shi, 632-0004 Japan, published by *The Transaction Of The Institute of Electronics, Information and Communication Engineers D-1*, vol. J81-D-1 No. 2, Feb. 1998.

Publication: "*A Parallel Analog Intelligent Vision Sensor With a Variable Receptive Field*" by Tetsuya Yagi and Seiji Kameda of the Faculty of Computer Science and System Engineering, Kyushu Institute of Technology, Iizuka, Japan 820-8502 and Kunihiko Iizuka of the Advanced Technology Research Laboratories, Sharp, Tenri, Japan 632-0004, published by *Systems and Computers in Japan*, vol. 30, No. 1, 1999.

Publication: "*Image Processing Regularization Filters On Layered Architecture*" by Haruo Kobayshiof Yokogawa Electric Corporation, Takashi Matsumoto of Waseda University, Tetsuya Yagi of the Kyushu Institute of Technology and Takuji Shimmi of the Kyushu Institute of Technology, published by *Neural Networks*, vol. 6, pp. 327-350, 1993.

Publication: "*An Analog VLSI Chip Emulating Sustained And Transient Response Channels Of The Vertebrate Retina*" by Seiji Kameda of the Faculty of Computer Science and System Engineering, Iizuka, Japan and Tetsuya Yagi of the Department of Electronic Engineering, Osaka University, Osaka, Japan, published by *IEEE Transaction On Neural Networks*, vol. 14, No. 5, Sep. 2003.

Publication: "*Vision Chip Architecture With Light Adaptation Mechanism*" by Tetsuya Yagi of the Faculty of Computer Science and System Engineering, Kyushu Institute of Technology, Iizuka 820-8502, Japan, Haruo Kobayashi of the Department of Electronic Engineering, Gunma University, Kirya 376-8515, Japan, Takashi Matasumoto and Koji Tanaka of Department of Electrical, Electronics and Computer Engineering, Waseda University, Tokyo 169-8555, Japan, published by *Anif Life Robotics* (1998) 2:12-18.

International Application No. PCT/JP02/08915 filed Sep. 3, 2002, International Publication No. WO 03/023712 A1 published Mar. 20, 2003.

International Search Report, PCT/ISA/210,220 of International Application PCT/JP02/08915 filed Aug. 3, 2002, International Publication No. WO 03/023712 A1 published Mar. 20, 2003.

International Preliminary Examination Report, Form PCT/IPEA/401, 402, 409, 416 of International Application No. PCT/JP02/08915.

PCT Notification of Receipt Of Record Copy of International Application No. PCT/JP02/08915 mailed Oct. 30, 2002.

PCT Notification Concerning Submission or Transmittal Of Priority Document of International Application No. PCT/JP02/08915 mailed Nov. 14, 2002.

PCT Notice Informing the Applicant Of The Communication Of The International Application to the Designated Offices of International Application No. PCT/JP02/08915 mailed Mar. 20, 2003.

PCT Information Concerning Elected Offices Notified Of Their Election of International Application No. PCT/JP02/08915 mailed May 27, 2003.

PCT Notification Of The Recording Of A Change of name of applicant from Japan Science and Technology Corporation to Japan Science and Technology Agency for International Application No. PCT/JP02/08915 mailed Jan. 16, 2004.

Abstract: Japanese Publication No. 08-054283 published Feb. 27, 1996, Japanese Application No. 06-187643, filed Aug. 10, 1994, of Nippon Telegr & Teleph Corp., inventors Kimura Kazuo, Koda Shigeto and Yamauchi Noriyoshi, pertains to an Image Input Device.

Abstract: Japanese Publication No. 07-085260 published Mar. 31, 1995, Japanese Application No. 05-252412, filed Sep. 14, 1993, of Nippon Steel Corp., inventors Ishii Hidekazu, Yamada Yoshihiro and Ishikawa Masatoshi, pertains to a Two-Dimensional Sensor Device.

Abstract: Japanese Publication No. 64-57550 published Oct. 4, 1989, Japanese Application No. 62-153010, filed Jun. 10, 1987, of NRI & NCC Co., Ltd., inventor Kimura Shoichi, pertains to a Logic Array.

\* cited by examiner

TIMINGS OF CONTROL SIGNALS (A) SCHEMATIC DIAGRAM OF RESISTANCE NETWORK (B) OUTPUT VOLTAGE DISTRIBUTION OF RESISTANCE NETWORK AT SPATIAL IMPULSE INPUT

IMAGE SENSING APPARATUS

CROSS REFERENCES TO RELATED APPLICATIONS

This application is based upon priority International Application PCT/JP02/08915 filed Sep. 3, 2002, International Publication No. WO 03/023712 A1 published Mar. 20, 2003, which is based upon Japanese Application 2001-269120 filed Sep. 5, 2001.

BACKGROUND OF THE INVENTION

The present invention relates to an image sensing apparatus, and more particularly to an image sensing apparatus called "vision chip", which is applied to a vision sensor and image processing. Here, the "vision chip" signifies, for example, a visual sensor chip (semiconductor or circuit) in which a super-parallel circuit structure with optical sensor circuits and processing circuits arranged for individual pixels is realized by an analog CMOS integrated circuit, and which can perform visual information processing. Among such vision chips, especially a vision chip which simulates the circuit structure and functions of an organic retina shall be called "silicon retina".

Shown in FIG. 22 is the schematic constructional view of a vision chip. A lower view is the enlarged view of the vision chip 61. As in the enlarged view, each pixel includes an optical sensor 63 and a processing circuit 64. Image information is projected on the vision chip 61 through an optical system constructed of a lens 62, etc. The projected image information is converted into electric signals by the optical sensors 63, and the electric signals are processed in super-parallel fashion by the processing circuits 64 arranged in the respective pixels. Besides, the processing circuits 64 convert the electric signals into information which is easily understood by a higher-degree recognition apparatus such as computer or microprocessor, and which is outputted.

Owing to such a vision chip, a problem at which a prior-art image processing system based on a serial type digital computer is inapt can be solved. Various vision chips have heretofore been developed, and the principal items of visual information processing incarnated by the vision chips are, for example, "image smoothing", "contour emphasis" and "motion detection".

Shown in FIG. 23 is the circuit arrangement view of a single-chip system. Here, a vision chip which performs the smoothing, contour emphasis and velocity detection of an input image as one circuit example will be mentioned. In case of the single-chip system, besides an optical sensor 63, the processing circuits of a smoothing circuit 65, a contour emphasis circuit 66 and a motion detection circuit 67 must be respectively arranged in each pixel as shown in the figure.

SUMMARY OF THE INVENTION

With the vision chip of the single-chip system as stated above, however, the optical sensor and the processing circuits are arranged in each pixel, so that the geometrical structure (pixel size) of one pixel enlarges inevitably. Moreover, with the prior-art vision chip, various visual processing functions need to be incarnated by one chip, so that the number of pixels per unit area of the chip decreases to degrade a spatial resolution. Furthermore, with the prior-art vision chip, the pixel size is made small by simplifying the pixel structure, so that satisfactory image processing cannot be executed in higher-degree recognition processing at the posterior stage in some cases. Besides, when a countermeasure in which the number of pixels is increased by enlarging a chip size is taken, the cost of the chip rises (incidentally, this is also ascribable to the fact that unusable chips increase with increase in the number of fabricated chips), and the chip size itself has a limitation dependent upon a CMOS manufacturing process, from the viewpoint of available percentage.

In view of the above drawbacks, the present invention has for its object to adopt the construction of a so-called "multi-chip system" in which processing to be executed by one chip is divided and performed by a plurality of chips, whereby the various processing steps of image processing or the like are performed by a super-parallel circuit structure, and they are executed in real time. Also, the invention has for its object to provide a system of low price, small size and low dissipation power utilizing, for example, CMOS. Further, the invention has for its object to provide a system having robustness peculiar to analog devices.

According to the resolution means of the present invention, there is provided an image sensing apparatus comprising:

first pixel circuits each of which includes an optical sensor that converts an inputted light signal into an electric signal, and a first processing circuit that executes first analog processing for the output from the optical sensor and outputs analog image information; and second pixel circuits each of which includes a second analog memory that receives the analog image information from the first processing circuit of said first pixel circuit and stores the received analog image information, and a second processing circuit that reads out the image information from the second analog memory, executes second analog processing and outputs analog image information, and which is disposed in correspondence with said first pixel circuit;

wherein the first and second pixel circuits being respectively arranged in matrix shapes so as to form first and second chips, and the first and second processing circuits respectively receiving analog signals from the nearby first and second processing circuits in the first and second chips corresponding thereto, so as to compensate for characteristics and to execute the first and second analog processing by parallel calculations.

A more detailed explanation of the invention is provided in the following description and appended claims take in conjunction with the accompanying drawings.

DETAILED DESCRIPTION OF THE INVENTION

The following is a detailed description of the preferred embodiments of the invention and best mode of practicing the invention.

1. Multi-Chip System

Figure 1:
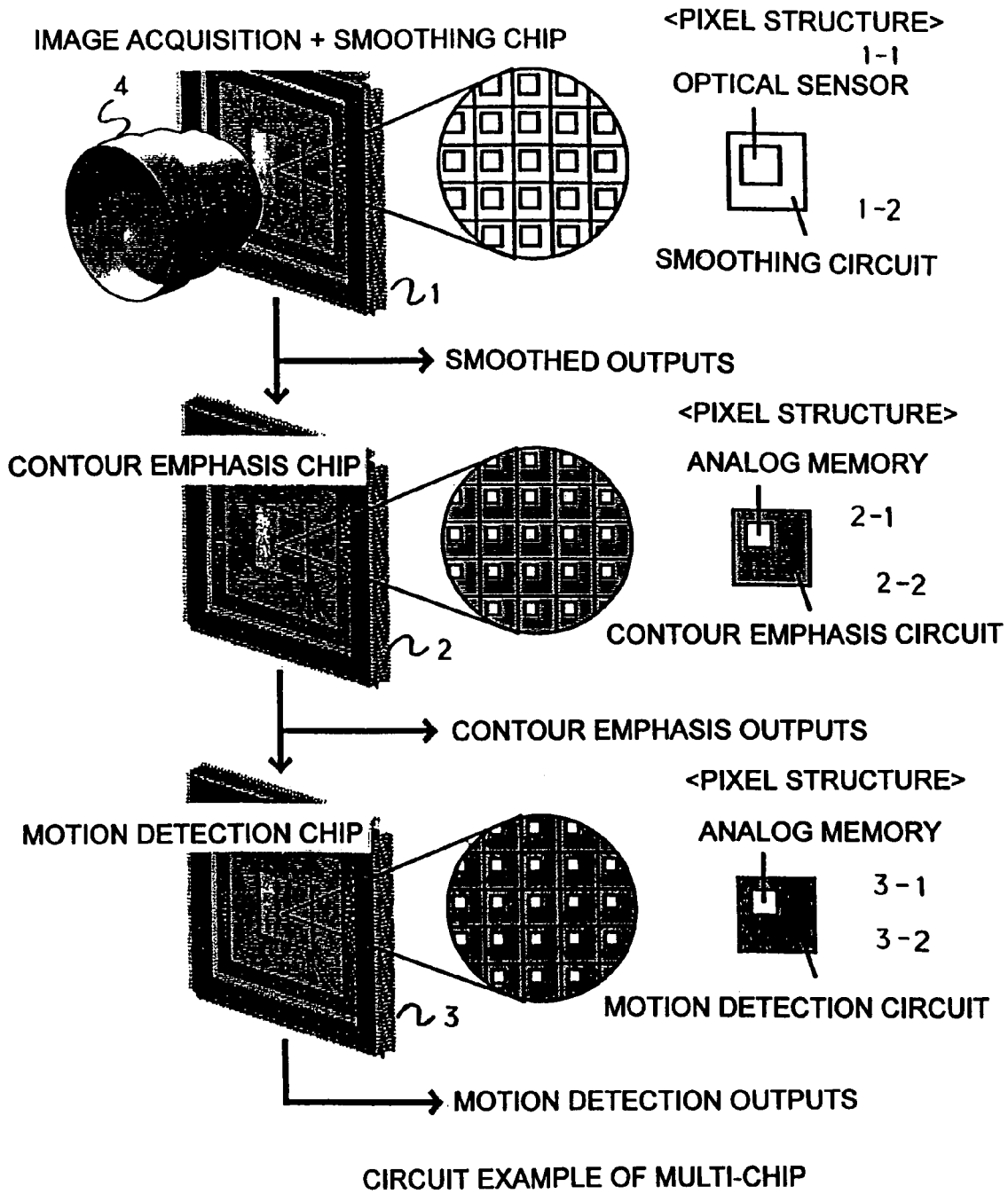
FIG. 1 is a constructional view of a image sensing apparatus being a multi-chip system.

Shown in FIG. 1 is the constructional view of an image sensing apparatus being a multi-chip system. In this embodiment, by way of example, the three processing items of smoothing, contour emphasis and motion detection are respectively distributed to three chips, which are constructed into a multi-chip. The smoothing chip 1 of first stage, to which image information is inputted from an optical system 4 constructed of a lens, etc., includes an optical sensor circuit 1-1, and a smoothing circuit 1-2 which is a processing circuit for smoothing, thereby to smooth an input image. The smoothed image information is outputted as voltage or current analog signals from the first-stage smoothing chip 1, and the analog signals are inputted to the contour emphasis chip 2 and motion detection chip 3 of second stage, et seq. The pixels of the contour emphasis chip 2 and motion detection chip 3 at the second stage, et seq. include analog memories 2-1, 3-1, and a contour emphasis circuit 2-2 and a motion detection circuit 3-2 which are dedicated processing circuits, respectively. The analog memories 2-1, 3-1 temporarily store the analog information from the preceding stages, respectively. The contour emphasis circuit 2-2 and motion detection circuit 3-2 read the information of the analog memories 2-1, 3-1 (if necessary, they are also capable of writing information), respectively. Here, contour-emphasized image information items are outputted from the second-stage contour emphasis chip 2, while motion-detected results are outputted from the third-stage motion detection chip 3.

As the features of such a multi-chip system, the following points, for example, are mentioned:

Processing which is performed by one chip can be limited (processing functions can be distributed).

A pixel size is small.

The number of pixels can be increased without enlarging a chip size.

Since outputs are delivered in parallel from a plurality of chips, high-degree image processing which utilizes a plurality of visual information items can be executed.

A compensation circuit is easily arranged in each pixel in order to remove circuit noise which is added in image processing and data transfer.

Analog information is employed for image processing and the transfer of data. Besides, the image processing can be executed at high speed by a super-parallel circuit structure which is based on analog processing circuits arranged in individual pixels. This point is clearly different from the operation of any existing DSP (Digital Signal Processor) for image processing.

Here, the differences between the present invention and the DSP will be described.

In case of the DSP, image information outputted from imaging equipment such as a CCD camera is converted by an A/D converter into digital signals, which are sent to the DSP, and digital image processing is executed by the DSP. In contrast, in case of the embodiment of the present invention, at the stage of the first-stage smoothing chip 1, image information is initially acquired and is simultaneously subjected to super-parallel analog image processing by the analog processing circuits of the individual pixels (point of difference from the CCD camera). Subsequently, computed analog information items are directly outputted from the first-stage smoothing chip 1 and are inputted to the contour emphasis chip 2 of the next stage (A/D conversion is not performed). Subsequently, the information items from the first-stage smoothing chip 1 are inputted to the analog memories arrayed in the respective pixels of the next-stage contour emphasis chip 2 and are further subjected to super-parallel processing by the analog processing circuits of the respective pixels (point of difference from digital image processing). Besides, information items from the contour emphasis chip 2 are inputted to the analog memories arrayed in the respective pixels of the next-stage motion detection chip 3 and are further subjected to super-parallel processing by the analog processing circuits of the respective pixels.

In general, a processing circuit can be designed on a smaller scale in an analog circuit than in a digital circuit. Assuming that DSPs be arranged in individual pixels with the intention of performing parallel image calculations, there are such problems as follows:

A pixel size becomes large.

Wiring for connecting respective pixels becomes complicated.

In contrast, according to the present invention, these problems are relieved for the reason that the respective pixels are constructed of analog circuits.

As a problem peculiar to an analog integrated circuit, however, the influence of dispersion ascribable to the non-uniformity of element characteristics is supposed in some cases. This signifies that, even when circuits being geometrically quite the same are designed within an identical chip, the electrical characteristics of the individual circuits become discrepant. In addition to the discrepancy appearing within the chip, the tendency appears more intensely among separate chips. The dispersion of the element characteristics among the respective pixels in the super-parallel circuit structure as in the present invention, and the change of the information items of the preceding and succeeding chips in the case of the transfer of image information to the next stage need to take countermeasures when they are serious.

In the present invention, therefore, the problem is solved in such a way that a circuit which compensates for the dispersion (circuit noise) attendant upon the non-uniformity of the element characteristics is incorporated in each pixel. In the compensation circuit, the circuit noise of the corresponding pixel is stored in a certain sort of analog information storage element, thereby to incarnate image processing and data transfer which are not influenced by the circuit noise. Concretely, a noise compensation buffer circuit (to be explained later) is supposed, but any circuit having a similar function can be substituted therefor.

2. Outline of Circuit arrangement of Chips constituting Multi-Chip System

The sorts of chips constituting a multi-chip system are broadly divided into the following two types in the embodiment of the present invention:

Type 1: an optical sensor for acquiring image information, and a processing circuit are built in each pixel Type 2: an analog memory for storing image information from a preceding stage, and a processing circuit are built in each pixel Circuit arrangements will be described on the types 1 and 2.

(1) Circuit arrangement of Type-1 chip (Image acquisition+Parallel image processing)

The chip of Type 1 is at the first stage of the chip system to-be-constructed, and it acquires the image information items of the outside world by the optical sensors built in the respective pixels and subjects the acquired information items to image processing in parallel.

Figure 2:
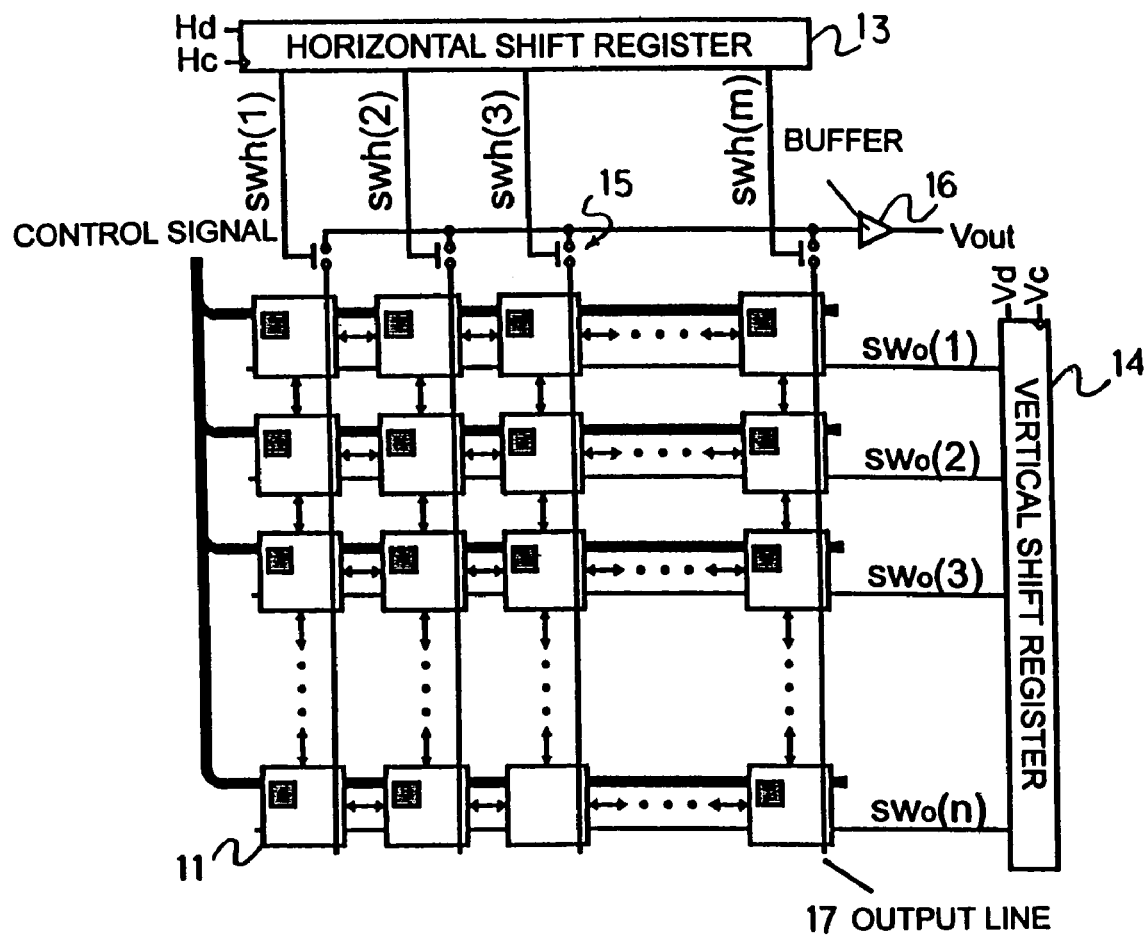
FIG. 2 is a block diagram of a type-1 chip.

Shown in FIG. 2 is the block diagram of the type-1 chip.

The type-1 chip includes pixel circuits 11, a horizontal shift register 13, a vertical shift register 14, switches 15, an outputting buffer 16, and an output line 17. The pixel circuits 11 are sequentially selected by the horizontal shift register 13 and the vertical shift register 14, so as to read out outputs calculated in parallel. (Incidentally, the timing chart of the shift registers will be explained later.)

Figure 3:
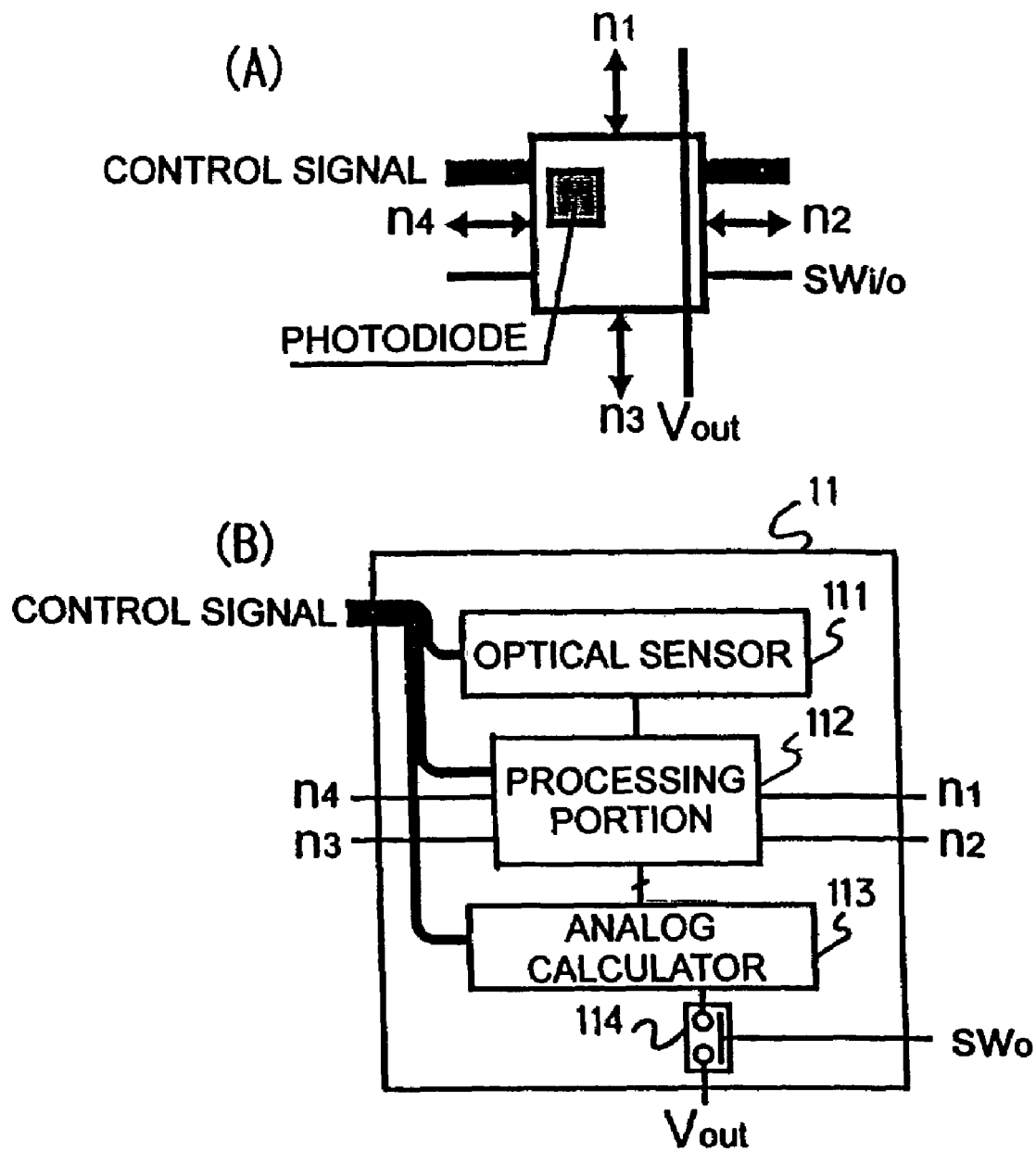
FIG. 3 is a block diagram of a pixel circuit of Type 1.

Shown in FIG. 3 is the block diagram of the pixel circuit of Type 1. The pixel circuit 11 includes an optical sensor 111, a processing portion 112, an analog calculator 113, and a switch 114. The roles of the respective constituents will be described below.

The optical sensor 111 converts an optical signal (image information) into an electric signal such as voltage or current. Used as a circuit element therefor is any of a photodiode, a phototransistor, an active pixel sensor, etc. The processing portion 112 receives an input from the optical sensor 111 of its own pixel circuit, and inputs n1-n4 from the nearby pixel circuits, and it performs image processing. This processing portion 112 chiefly performs parallel image calculations which employ the information items of the nearby pixels. The analog calculation portion 113 receives inputs from the processing portion 112, and performs an analog calculation conforming to the four rules of arithmetic, or the like. This analog calculation portion 113 may well simultaneously include a circuit which compensates for circuit noise ascribable to the dispersion of the characteristics of the individual elements, the circuit noise being a problem that is to be dealt with in an analog integrated circuit. The output of the analog calculation portion 113 becomes a pixel output. In this embodiment, a control signal for the pixel circuits 11 is inputted to all the pixels collectively, but it may well be inputted every pixel circuit or every row or column.

(2) Circuit arrangement of Type-2 chip (Analog memory+Parallel image processing)

The chip of Type 2 is at the second or subsequent stage of the chip system to-be-constructed, and it stores image information items delivered from the preceding stage, in the analog memories built in the respective pixels, and subjects the delivered information items to image processing in parallel by the processing circuits arranged in the respective pixels.

Figure 4:
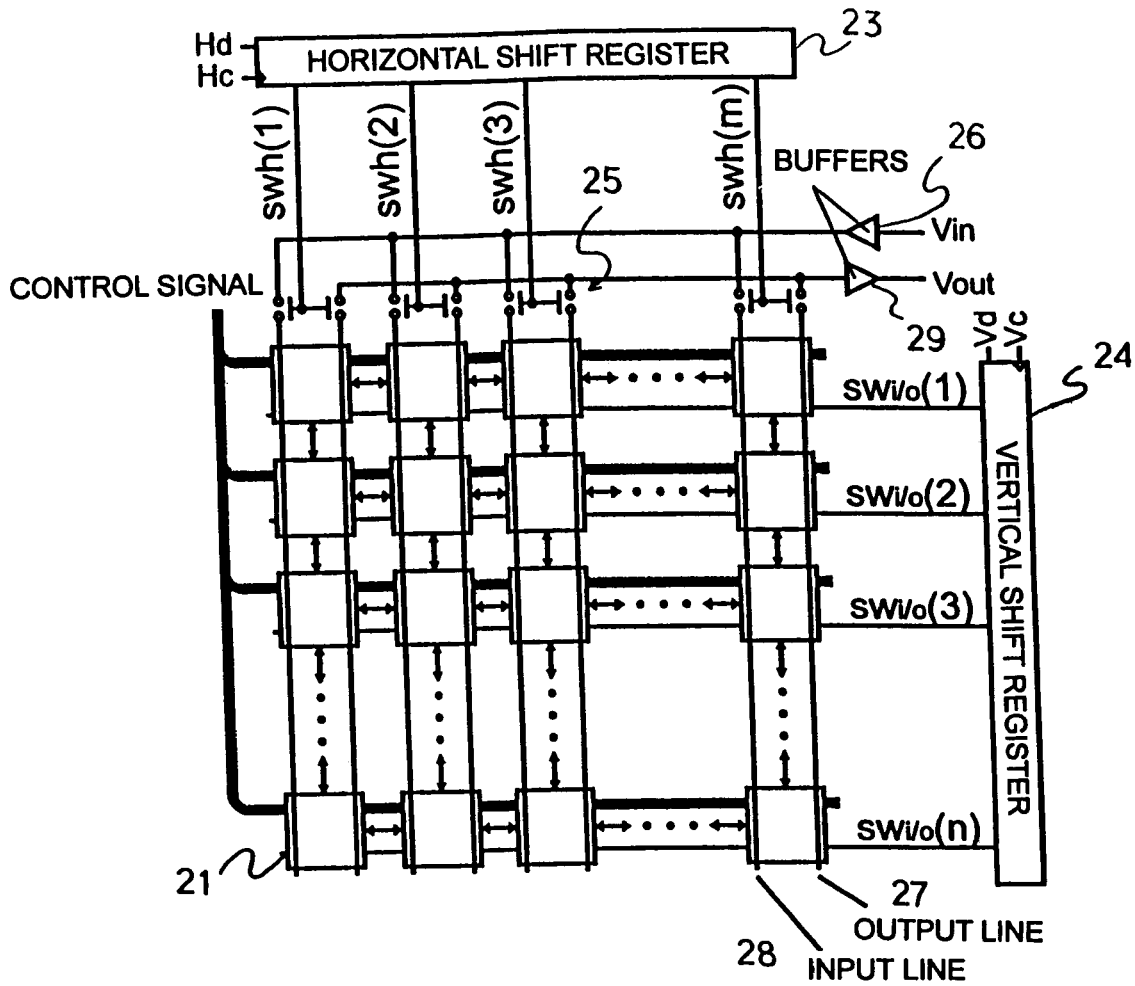
FIG. 4 is a block diagram of a type-2 chip.

Shown in FIG. 4 is the block diagram of the type-2 chip.

The type-2 chip includes pixel circuits 21, a horizontal shift register 23, a vertical shift register 24, switches 25, an inputting buffer 26, an output line 27, an input line 28, and an outputting buffer 29. Noticed pixels are sequentially selected by the horizontal shift register 23 and the vertical shift register 24, so as to input data from the chip of the preceding stage to the pixel circuits 21 and to read out outputs calculated in parallel. (Incidentally, the timing chart of the shift registers will be explained later.)

Figure 5:
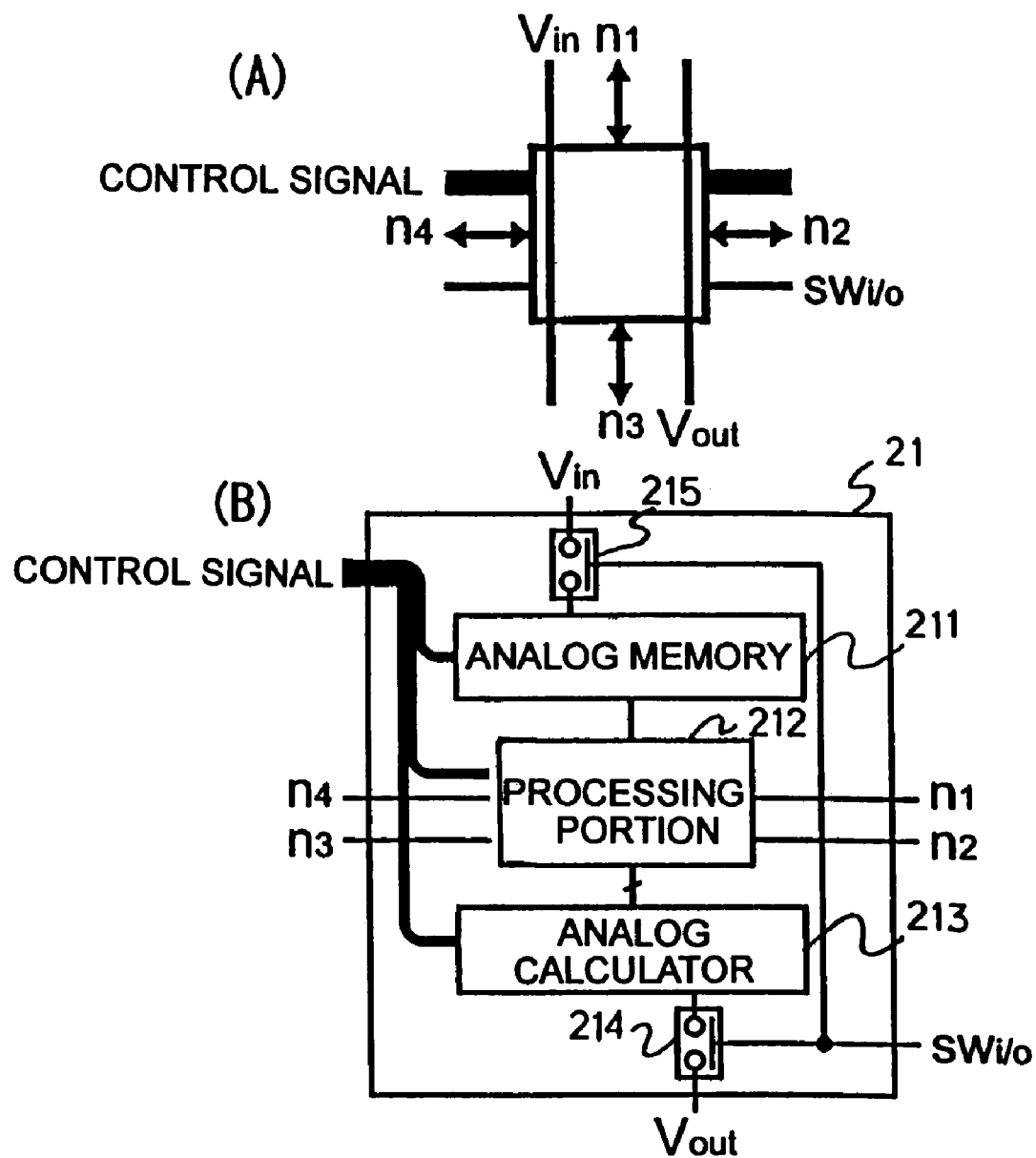
FIG. 5 is a block diagram of a pixel circuit of Type 2.

Shown in FIG. 5 is the block arrangement of the pixel circuit of Type 2.

The pixel circuit 21 is constructed of an analog memory 211, a processing portion 212, an analog calculator 213, and it includes switches 214, 215. The roles of the respective constituents will be described below.

The analog memory 211 stores image information inputted from outside (in this case, the pixel circuit of Type 1, the pixel circuit of Type 2 at the preceding stage, or the like). The processing portion 212 receives an input from the analog memory 211 of its own pixel circuit, and inputs n1-n4 from the nearby pixel circuits, and it performs image processing. This processing portion 212 chiefly performs parallel image calculations which employ the information items of the nearby pixels. The analog calculation portion 213 receives inputs from the processing portion 212, and performs an analog calculation conforming to the four rules of arithmetic, or the like. This analog calculation portion 213 may well simultaneously include a circuit which compensates for circuit noise ascribable to the dispersion of the characteristics of the individual elements, the circuit noise being a problem that is to be dealt with in an analog integrated circuit. The output of the analog calculation portion 213 becomes a pixel output. In this embodiment, a control signal for the pixel circuits is inputted to all the pixels collectively, but it may well be inputted every pixel circuit or every row or column.

Figure 6:
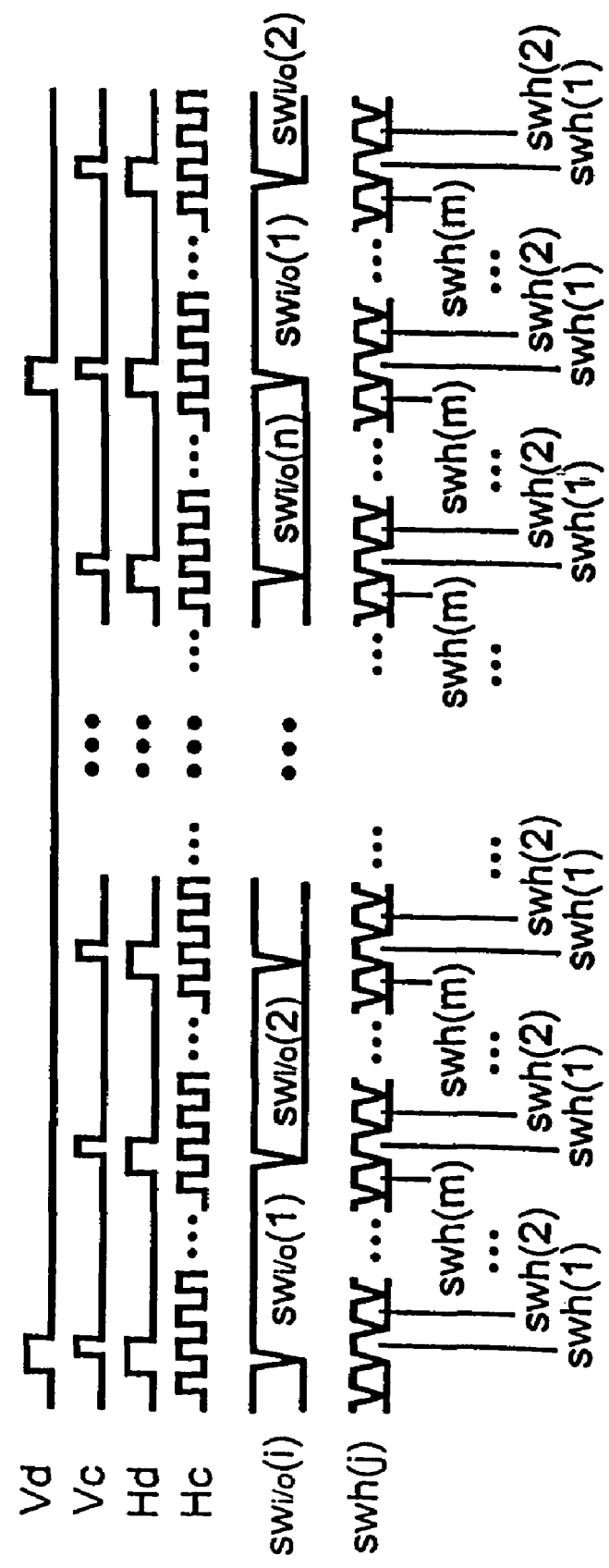
FIG. 6 is a timing chart of shift registers for selecting noticed pixels.

Next, shown in FIG. 6 is the timing chart of the shift registers for selecting noticed pixels.

In both the chips of Types 1 and 2, the horizontal shift registers 13, 23 and the vertical shift registers 14, 24 select noticed pixel circuits to/from which image information items are inputted/outputted. The basic timings of the shift registers become as shown in the figure. In the chip of Type 2, the row of a pixel array is selected by the vertical shift register 24, and the input/output switch SWi/o of the selected pixels is connected to the input/output lines of the respective columns. In this state, the input/output lines of one set are selected by the horizontal shift register 23 and the switch 25, and they are respectively connected to the input buffer 26 and the output buffer 29. That is, the input buffer 26 and the output buffer 29 are connected to the pixel selected by the row and the column. A situation in the case of Type 1 is similar, but the path of an input is unnecessary.

Figure 7:
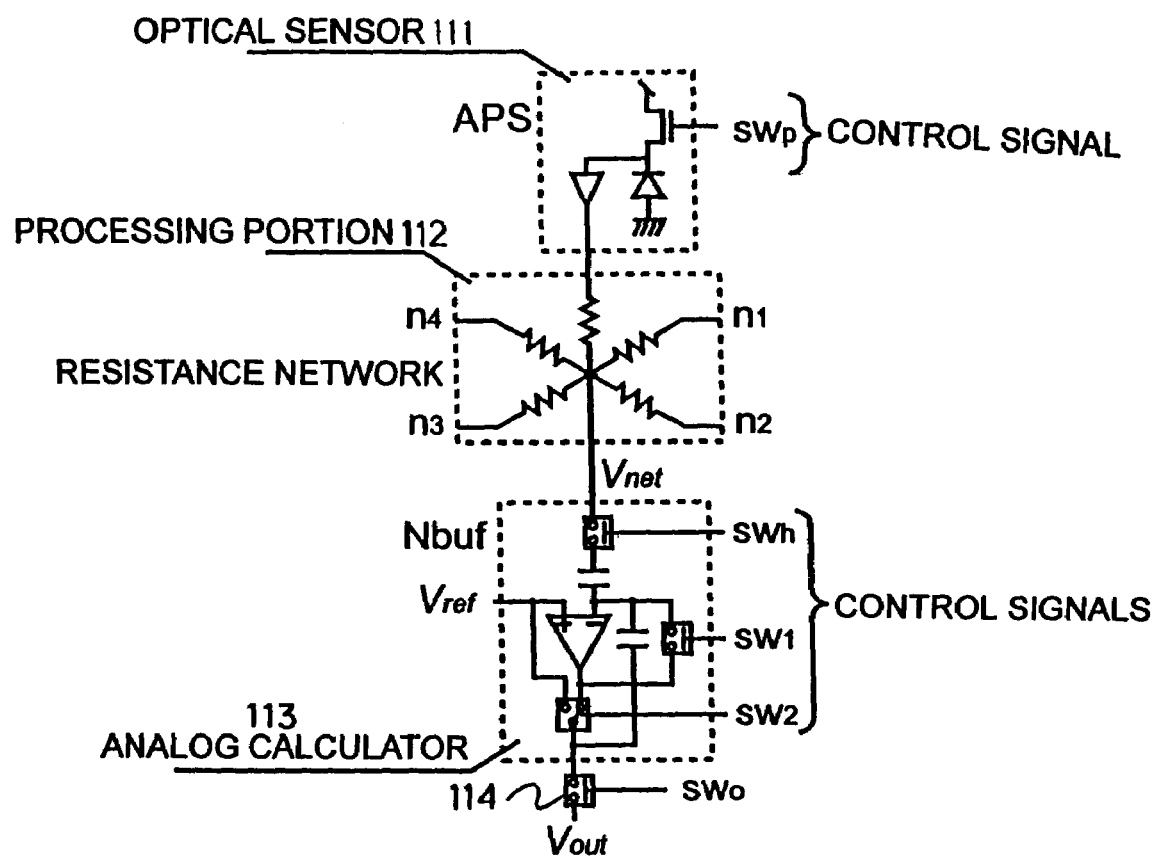
FIG. 7 is an arrangement diagram of the pixel circuit of one pixel of Type 1.

3. Circuit Examples of Chips (1) Circuit example of Type-1 chip: Image acquisition+Smoothing Shown in FIG. 7 is the arrangement diagram of the pixel circuit of one pixel of Type 1.

This pixel circuit includes an optical sensor 111, a processing portion 112, an analog calculator 113, and a switch 114. In this example, the optical sensor 111 is made an APS (active pixel sensor: to be explained later), which accumulates light charges and thereby converts a light signal into voltage information. The processing portion 112 is constructed of a resistance network here. Image information is inputted to the resistance network, whereby an input image can be smoothed in super-parallel fashion (as will be explained later). The resistance network is formed by having resistance-based connections (n1, n2, n3, n4) with nearby pixels, so as to smooth the input image. An output from the processing portion 112 is inputted to the analog calculator 113. The analog calculator 113 employs a noise compensation buffer circuit Nbuf: to be explained later. The noise compensation buffer circuit Nbuf can compensate for the dispersion of the circuits on the input side and the offset of an amplifier within this noise compensation buffer circuit Nbuf, in accordance with control signals. A switch SWo is controlled by the horizontal shift register 13 and the vertical shift register 14, whereby a noticed pixel can be selected to read out data.

Figure 8:
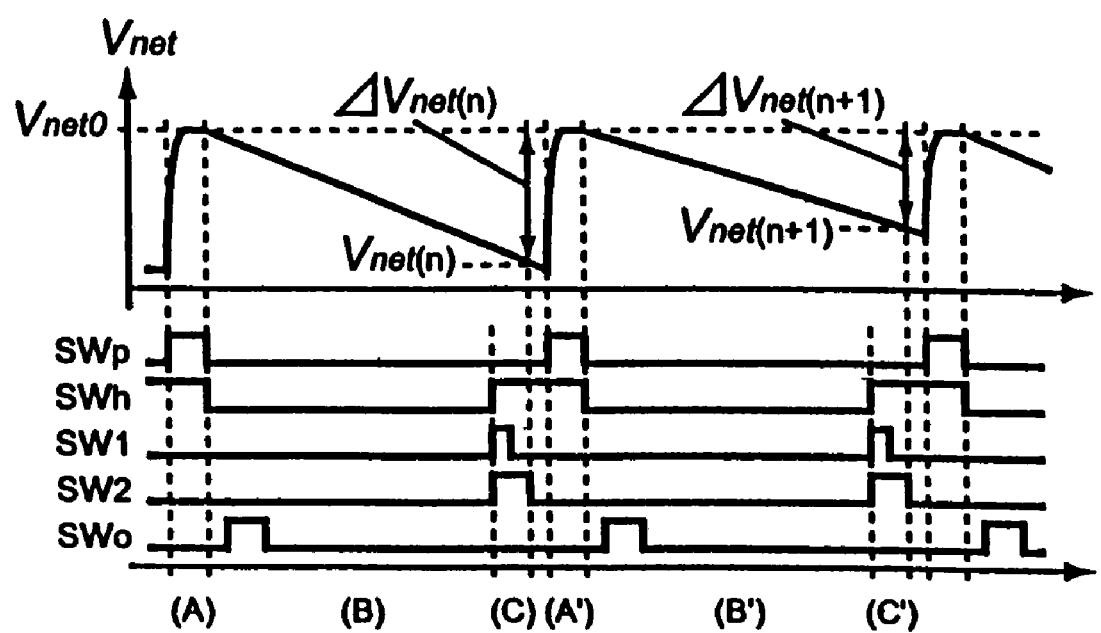
FIG. 8 is a timing chart concerning the operation of a pixel level.

Shown in FIG. 8 is a timing chart concerning the operation of a pixel level. Now, operations will be described as to individual intervals.

Interval (A): A control signal SWp for the switch of the APS is asserted to "L", thereby to initialize the APS. Thereafter, the control signal SWp is negated to "L", thereby to shift to a charge accumulating operation in the APS for the nth frame.

Intervals (B)+(C): Accumulation time of the APS

Interval (C): With the lapse of the accumulation time, a control signal SWh is asserted to "H", thereby to connect the resistance network of the processing portion 112 and the noise compensation buffer circuit Nbuf. On this occasion, the output Vnet of the resistance network becomes:

$$Vnet = Vnet(n) + VN1 \quad (1)$$

Here, Vnet(n) denotes image information processed by the resistance network, and VN1 denotes circuit noise at this time. Control signals SW1 and SW2 are controlled in this state, whereby the output of the resistance network as expressed by Eq. (1) is stored in a capacitance built in the noise compensation buffer circuit Nbuf.

Interval (A'): The control signal SWp for the switch of the APS is asserted to "L" again, thereby to initialize the APS. On this occasion, the output Vnet of the resistance network becomes:

$$Vnet = Vnet0 + VN0 \quad (2)$$

Here, Vnet0 denotes an initial voltage from the resistance network at the initialization of the APS, and VN0 denotes circuit noise at the initialization. That is, an input voltage to the noise compensation buffer circuit Nbuf has changed from Eq. (1) to Eq. (2). On this occasion, assuming that the magnitude of the circuit noise be always constant (VN1=VN0), an output Vout from the noise compensation buffer circuit Nbuf becomes:

$$Vout(n) = Vnet(n) - Vnet0 + VN1 - VN0 + Vref$$
$$= Vnet(n) - Vnet0 + Vref$$

so that the output which is proportional to processed information in the resistance network as is free from the influence of the circuit noise is obtained. Thereafter, the control signal SWh is asserted to "L", whereby the output is held in the noise compensation buffer circuit Nbuf. Besides, the control signal SWp is negated to "L", thereby to shift to a charge accumulating operation in the APS for the (n+1)th frame.

Interval (B'): Since the APS and the circuit Nbuf are electrically isolated, the output Vout(n) can be read out by closing an output switch signal SWo, in parallel with the accumulating operation in the APS for the (n+1)th frame.

The acquisition of image information and the smoothing operations based on the resistance networks can be performed by repeating the above operations.

(2) Circuit example 1 of Type-2 chip: Contour emphasis

Figure 9:
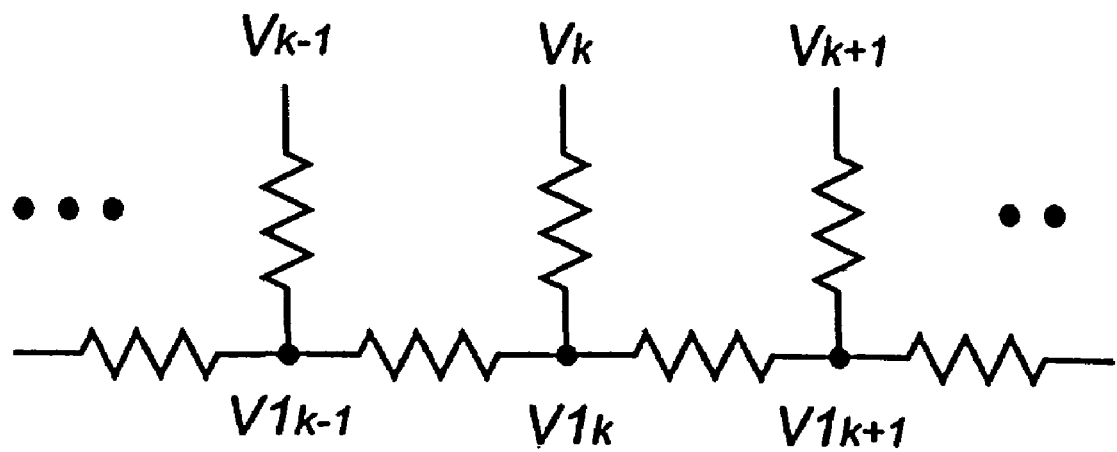
FIG. 9 is an arrangement diagram of a resistance network.

Shown in FIG. 9 is the arrangement diagram of a resistance network.

A network in which pixels are coupled by resistances as in the figure, is called the "resistance network". Owing to the resistance network, an input image can be smoothed (as will be explained later). The differential output between the input image and a smoothed image emphasizes the contour of the input image.

Figure 10:
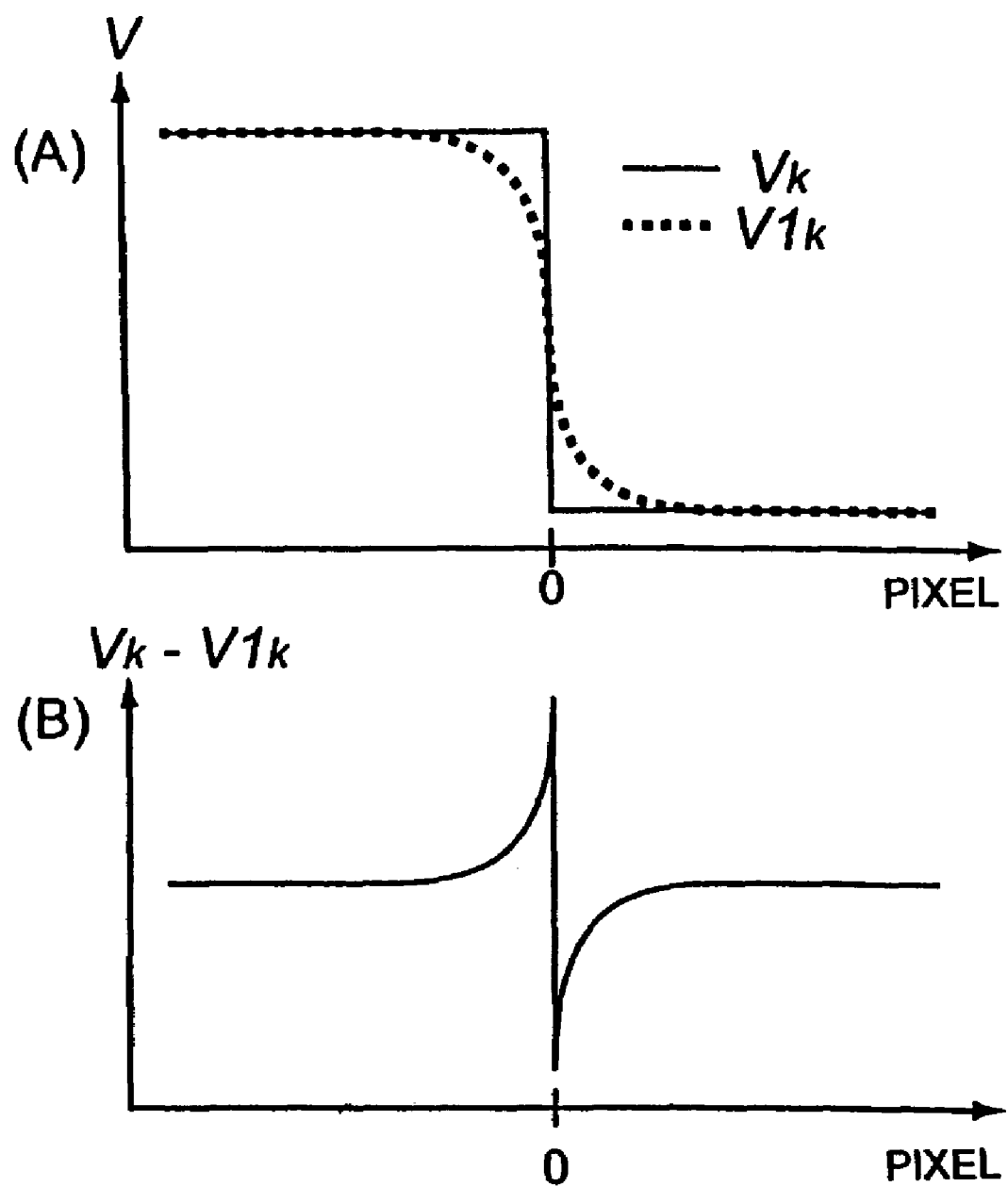
FIG. 10 is an explanatory diagram of the image of contour emphasis based on a unidimensional resistance network.

Shown in FIG. 10 is the explanatory diagram of the image of contour emphasis based on a unidimensional resistance network.

The axis of abscissas in Diagram (A) represents a pixel No., while the axis of ordinates represents corresponding pixel information (voltage). An input Vk whose voltage value changes greatly at the 0th pixel, is applied to the resistance network. This corresponds to the contour of an image. On this occasion, a signal V1k with a contour part smoothed is outputted from the resistance network. It is in Diagram (B) that the differential output between the signals Vk and V1k has been taken. It is seen that a great response is exhibited at the 0th pixel being the position of the contour, and that, around the 0th pixel, the voltage gradually comes to take a constant value with a distance from the position of the contour. That is, the contour part is emphasized.

Figure 11:
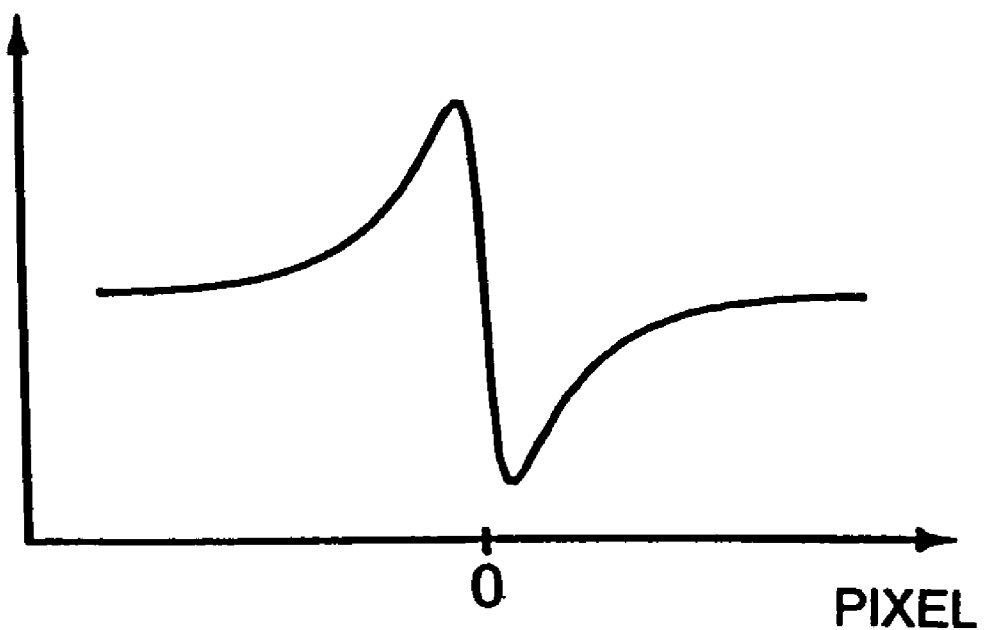
FIG. 11 is an explanatory diagram of the image of contour emphasis based on resistance networks of two layers.

Besides, shown in FIG. 11 is the explanatory diagram of the image of contour emphasis based on resistance networks of two layers.

When image information smoothed by another resistance network beforehand as stated above is employed as the input of a resistance network, that is, when resistance networks are used in two layers, an output as in the figure is obtained. It is known that the characteristics of the filter approximate Laplacian-Gaussian ($\nabla^2 G$) mathematically, and the smoothing of an input image and the emphasis of a contour can be simultaneously performed. Moreover, the filter is excellent for removing spatial image noise at high frequencies.

Figure 12:
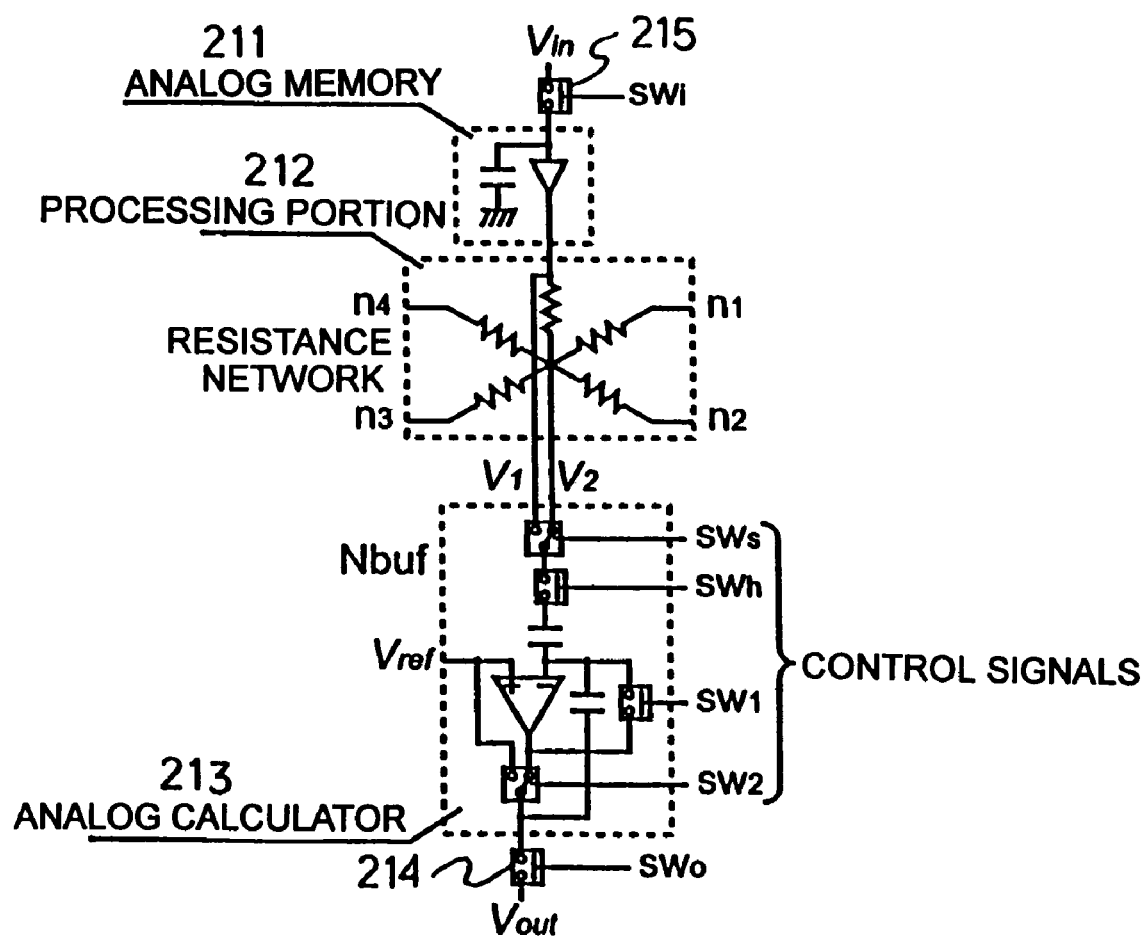
FIG. 12 is an arrangement diagram of the pixel circuit (2) of one pixel of Type 2.

Shown in FIG. 12 is the arrangement diagram of the pixel circuit (2) of one pixel of Type 2.

This pixel circuit includes an analog memory 211, a processing portion 212, an analog calculator 213, and switches 214, 215. The analog memory 211 stores external image information in a capacitor built therein. The processing portion 212 is constructed of a resistance network. This processing portion 212 forms the resistance network by having resistance-based connections (n1, n2, n3, n4) with nearby pixels, so as to smooth an input image. Both an input to and an output from the processing portion 212 are outputted to the analog calculator 213. A noise compensation buffer circuit Nbuf (to be explained later) is employed as the analog calculator 213. The noise compensation buffer circuit Nbuf can compensate for the dispersion of the circuits on the input side and the offset of an amplifier within this noise compensation buffer circuit Nbuf, in accordance with control signals. Signals SWi, SWo are controlled by the horizontal shift register 23 and the vertical shift register 24, whereby a noticed pixel can be selected.

Figure 13:
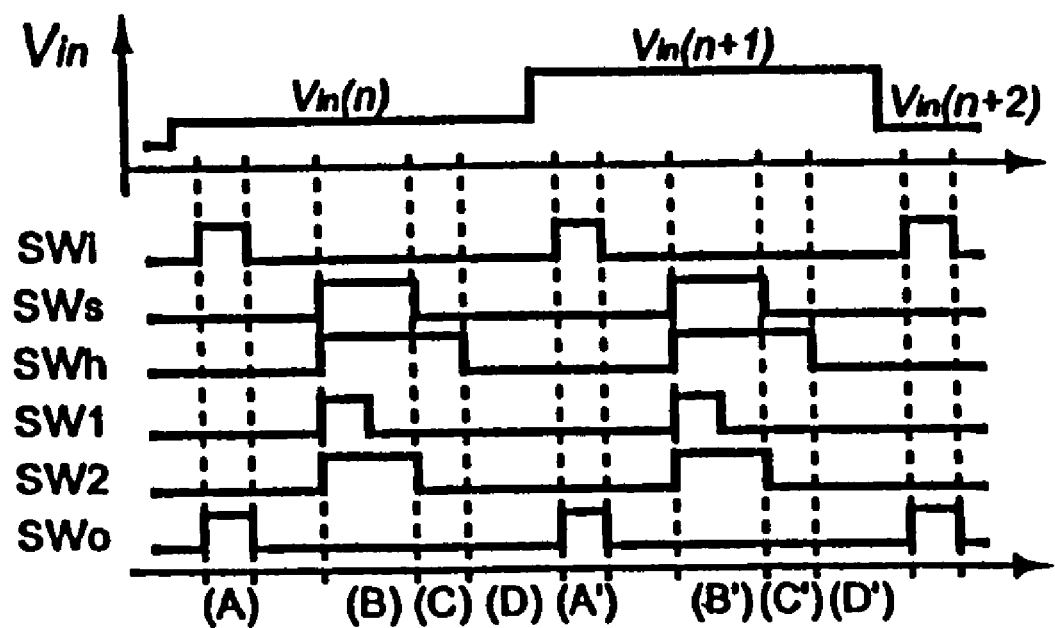
FIG. 13 is a timing chart concerning the operation of a pixel level.

Shown in FIG. 13 is a timing chart concerning the operation of a pixel level. Although one layer of the resistance network will be exemplified here, two layers may well be employed as stated above. Now, operations will be described as to individual intervals.

Interval (A): An input control signal SWi from the shift register is asserted to "H", thereby to store external image information (Vin(n)) in the analog memory 211.

Interval (B): The control signal SWh of a data holding switch and the control signal SWs of an input changeover switch are asserted to "H", thereby to connect the noise compensation buffer circuit Nbuf and an input V1 from the analog memory 211. The switching operations of the control signals SW1, SW2 of the noise compensation buffer circuit Nbuf are performed in this state, whereby the input V1 from the analog memory 211 is stored in the noise compensation buffer circuit Nbuf. Simultaneously, the dispersion of the input side of the circuit and the offset of the amplifier within the noise compensation buffer circuit Nbuf are compensated for (noise compensation operation).

Interval (C): The control signal SWs of the changeover switch is negated to "L", thereby to connect the noise compensation buffer circuit Nbuf and the output V2 of the resistance network, so that the following computation is executed in the noise compensation buffer circuit Nbuf:

$$Vout(n)=V2(n)-V1(n)+Vref$$

That is, an output which is proportional to the difference between the input image information $V1(n)$ and the smoothed output $V2(n)$ from the resistance network is obtained.

Interval (D): The control signal SWh of the data holding switch is negated to "L", whereby the computed image information is held in the noise compensation buffer circuit Nbuf.

Interval (A'): An output control signal SWo from the shift register is asserted to "L", thereby to read out the output Vout(n) held in the noise compensation buffer circuit Nbuf. Simultaneously therewith, the input control signal SWi from the shift register is asserted to "H", whereby image information (Vin(n+1)) at the next time is stored in the analog memory 211.

Thenceforth, similar operations are repeated, whereby a contour-emphasized output can be delivered.

(3) Circuit example 2 of Type-2 chip: Motion detection

Figure 14:
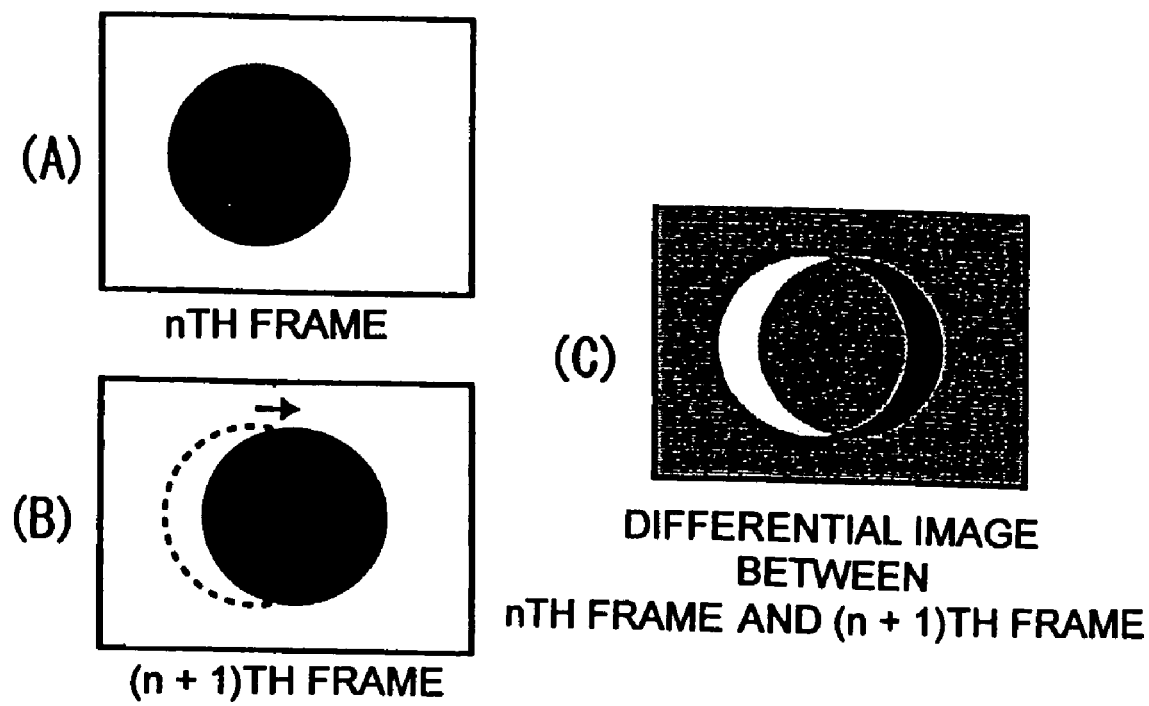
FIG. 14 is an explanatory diagram of the image of the difference between frames.

Shown in FIG. 14 is the explanatory diagram of the image of the difference between frames.

It is assumed that, in the image of the certain nth frame, a black disc have been entered in a white ground (Diagram (A)). It is supposed that the black disc have moved rightwards in the image of the (n+1)th frame (Diagram (B)). It is assumed that the image outputs of the nth and (n+1)th frames be voltage values, and the potential difference between these outputs is computed. Then, only the part of the movement responds as in Diagram (C). In this manner, the motion of an object can be computed by computing the difference between the frames.

Figure 15:
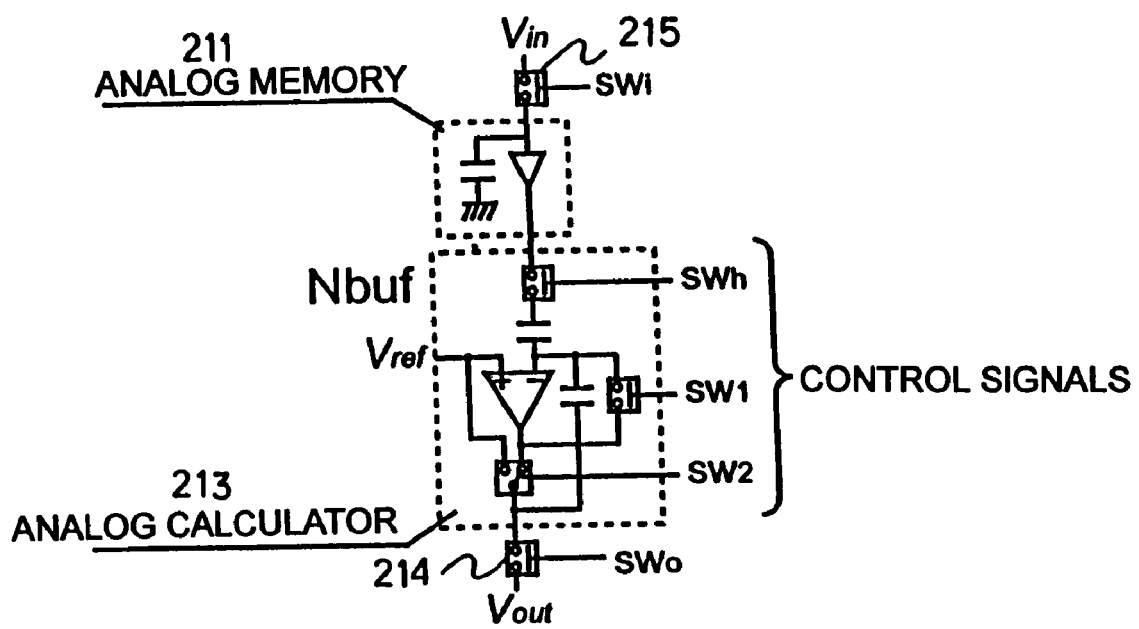
FIG. 15 is an arrangement diagram of the pixel circuit (1) of one pixel of Type 2.

Shown in FIG. 15 is the arrangement diagram of the pixel circuit (1) of one pixel of Type 2.

This pixel circuit includes an analog memory 211, an analog calculator 213, and switches 214, 215. The analog memory 211 stores external image information in a capacitor built therein. A noise compensation buffer circuit Nbuf (: to be explained later) is employed as the analog calculator 213.

The noise compensation buffer circuit Nbuf can compensate for the dispersion of the circuits on the input side and the offset of an amplifier within this noise compensation buffer circuit Nbuf, in accordance with control signals. Signals SWi, SWo are controlled by the horizontal shift register 23 and the vertical shift register 24, whereby a noticed pixel can be selected.

Figure 16:
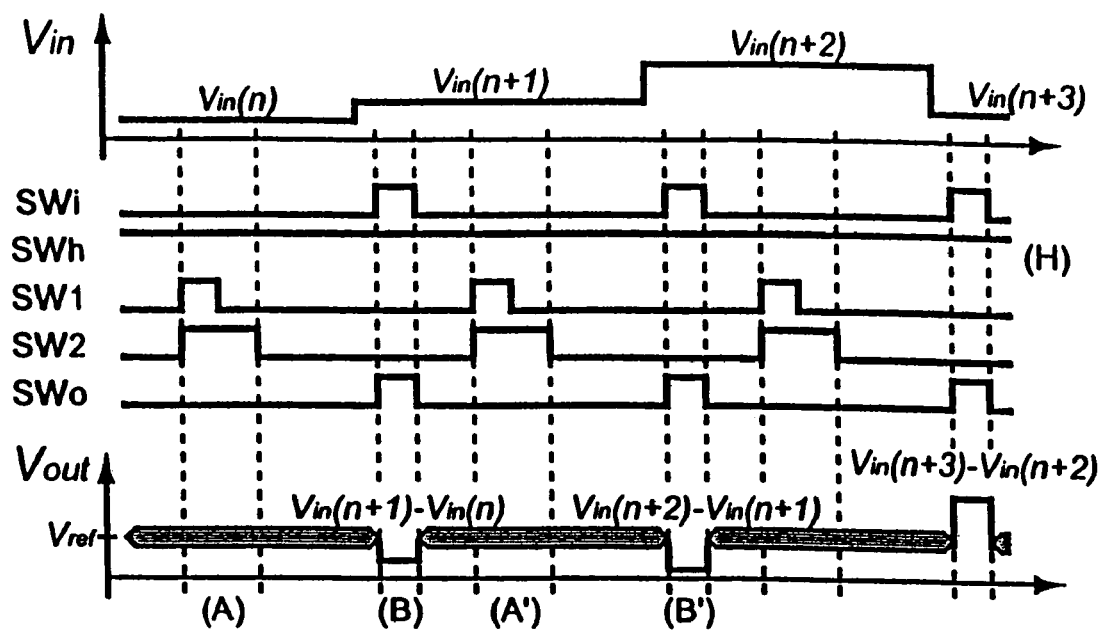
FIG. 16 is a timing chart concerning the operation of a pixel level.

Shown in FIG. 16 is a timing chart concerning the operation of a pixel level. Now, operations will be described as to individual intervals.

Initial condition: A signal SWh is always held at an "L" input, thereby to connect the analog memory 211 and the noise compensation buffer circuit Nbuf.

Interval (A): A pixel value (Vin(n)) on the analog memory 211 is stored in the noise compensation buffer circuit Nbuf by the switching operations of the control signals SW1, SW2 of this noise compensation buffer circuit Nbuf. Simultaneously, the dispersion of the input side of the circuit and the offset of the amplifier within the noise compensation buffer circuit Nbuf are compensated for (noise compensation operation).

Interval (B): An input control signal SWi from the shift register is asserted to "H", whereby the information of the analog memory 211 is updated to information at the next time (Vin(n+1)). Simultaneously, the following computation is executed in the noise compensation buffer circuit Nbuf:

$$Vout=Vin(n)-Vin(n+1)+Vref$$

That is, an output which is proportional to the difference between the pixel information at the current time (n+1) and the pixel information at the last time (n) is obtained. An output control signal SWo is asserted to "H", thereby to read out the output of the noise compensation buffer circuit Nbuf.

Interval (A'): The switching operations of the control signals SW1, SW2 are performed again, whereby pixel information (Vin(n+1)) on the analog memory 211 is stored in the noise compensation buffer circuit Nbuf, and the noise compensation operation is performed by the noise compensation buffer circuit Nbuf.

Thenceforth, similar operations are repeated, whereby the differential output between frames can be delivered.

4. Constructional examples of Multi-chip systems

Figure 17:
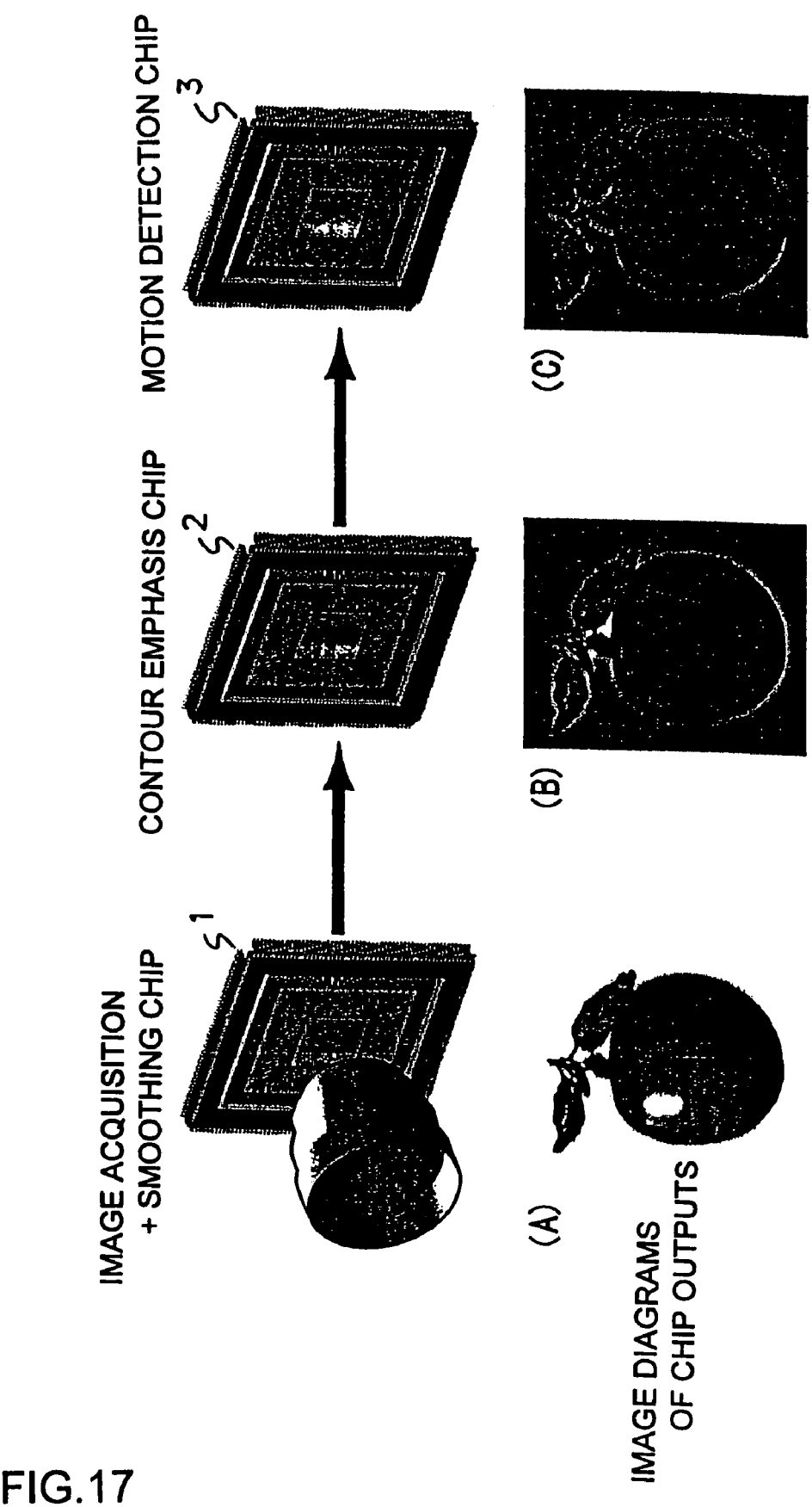
FIG. 17 is a constructional view of a multi-chip system.

Shown in FIG. 17 is an example of the constructional view of a multi-chip system.

Here, the following chips mentioned as the chip circuit examples above are constructed in the form of the multi-chip system:

Image acquisition+smoothing chip 1
Contour emphasis chip 2
Motion detection chip 3

Here will be described a circuit example in which the image acquisition+smoothing chip 1, the contour emphasis chip 2 and the motion detection chip 3 are connected in series in this order.

First, the acquisition of an input image and the smoothing of the input image are performed in the smoothing chip 1 of the initial stage. When the image of an apple has been projected on the smoothing chip 1 as shown in Diagram (A), an output in which spatial noise components contained in the image are smoothed is obtained.

The output of the initial-stage smoothing chip 1 is inputted to the contour emphasis chip 2 of the second stage. Since contour emphasis processing with the smoothed image is executed in the second-stage contour emphasis chip 2, a filter of Laplacian-Gaussian type is formed, and an output in which the smoothing and contour emphasis of the input image are done is obtained. It is understood that, as shown in Diagram (B), feature quantities such as the contour of the apple and the strings of leaves are emphasized.

The output of the second-stage contour emphasis chip 2 is inputted to the motion detection chip 3 of the third stage. A part where the image with the contour of the input image emphasized has moved, can be detected in the third-stage motion detection chip 3. When the apple has horizontally moved rightwards, it is understood that, as in Diagram (C), the output of the contour in the direction in which the apple moves appears low (in black), whereas the output of the contour on the opposite side appears high (in white), almost no response being exhibited in the vertical direction in which the apple does not move.

Owing to such construction of the chip system, the "smoothed image", "contour-emphasized image" and "motion image" can be outputted in parallel.

Figure 18:
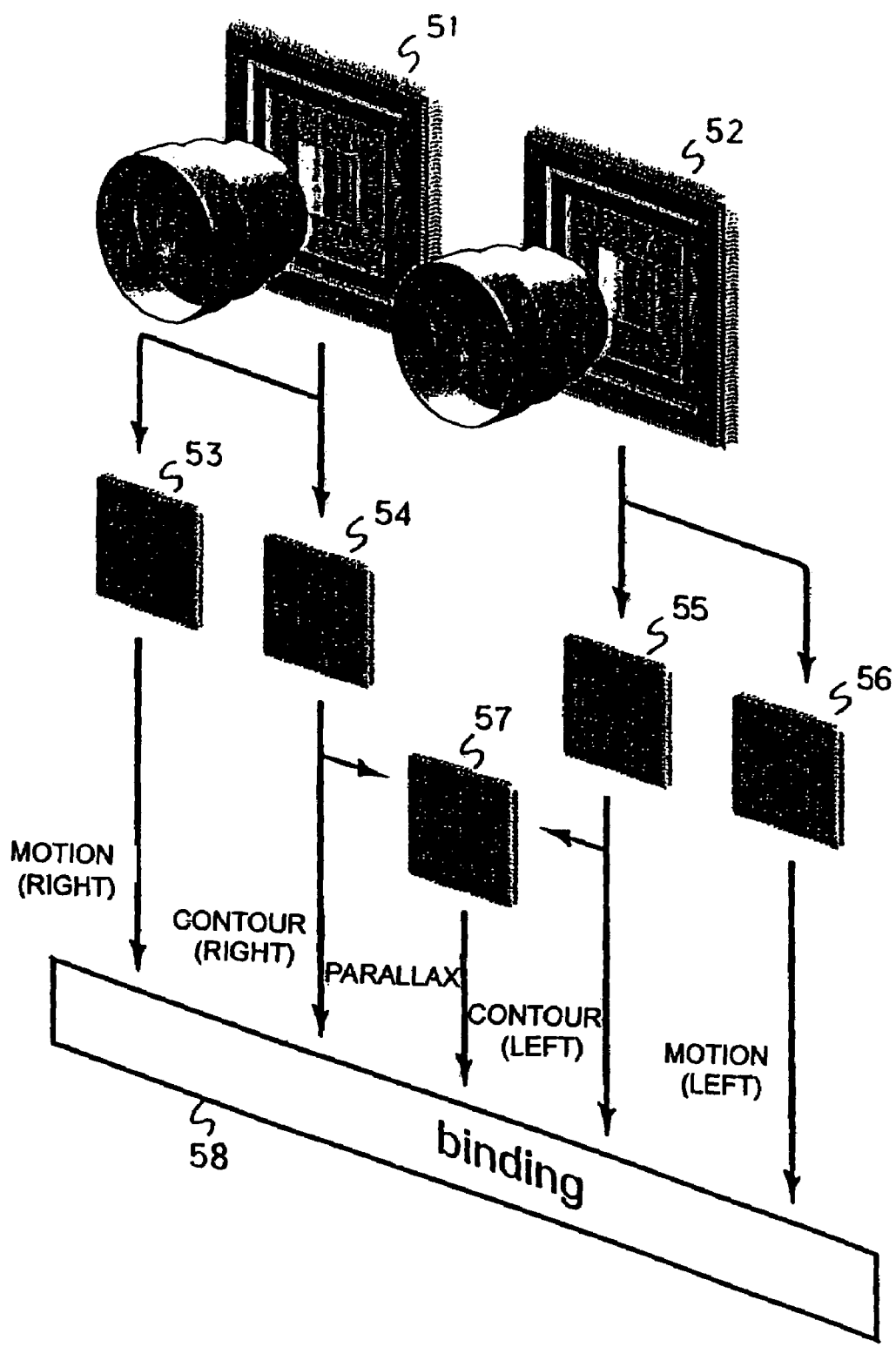
FIG. 18 is a view of a binocular stereoscopic system constructed of multi-chip systems.

Next, shown in FIG. 18 is an example of the constructional view of a binocular stereoscopic system constructed of multi-chip systems.

Even a complicated image processing system such as of binocular stereoscopy can be coped with by preparing two chips 51, 52 of Type 1 for acquiring images as shown in the figure.

The outputs of the two type-1 chips 51, 52 are inputted to a plurality of visual function chips 53, 54, 55, 56 so as to derive visual information items in parallel. Thereafter, the information items are bound. This permits to precisely and quickly solve the corresponding point problem at which a general serial image processing system is inapt.

Here, the visual function chips 53, 56 function as the motion detection chips stated above, and the visual function chips 54, 55 function as the contour emphasis chips stated above. Besides, a visual function chip 57 applies the motion detection chip and receives the outputs of the two visual function chips 54, 55, thereby to have the function of detecting the difference of the outputs.

5. Circuit Examples

Figure 19:
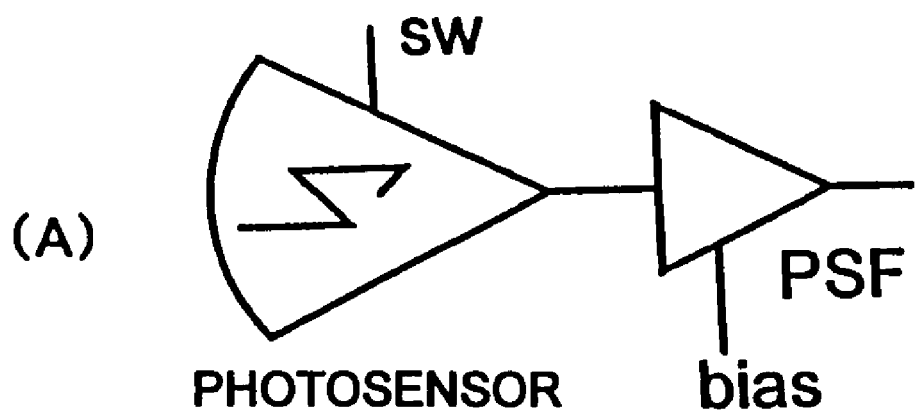
FIG. 19 is a circuit diagram of an active pixel sensor.
Figure 19:
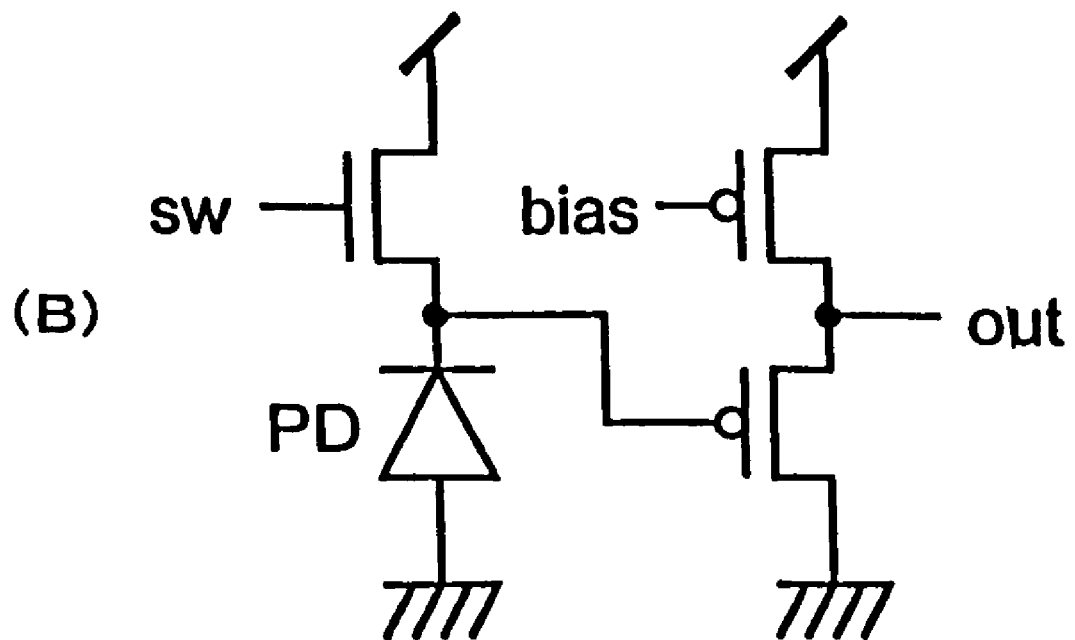

Shown in FIG. 19 is an example of the circuit diagram of an active pixel sensor.

In this example, a photosensor is used in a charge accumulating mode, and a source-follower circuit is added to the output node of the photosensor, thereby to construct the active pixel sensor (APS). Since the output of the photosensor lowers to the amount of the threshold voltage of MOS at initialization, a PMOS source follower (PSF) is employed as the source-follower circuit.

Figure 20:
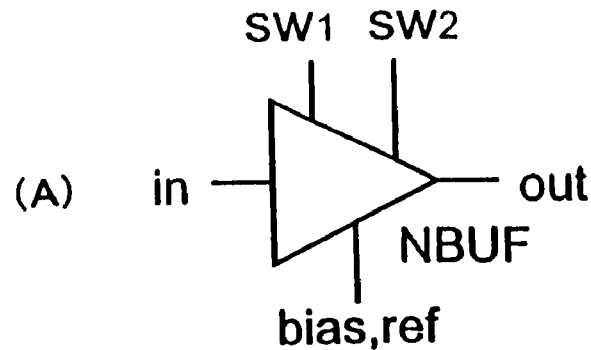
FIG. 20 shows a circuit diagram of a noise compensation buffer, and a timing chart of control signals.
Figure 20:
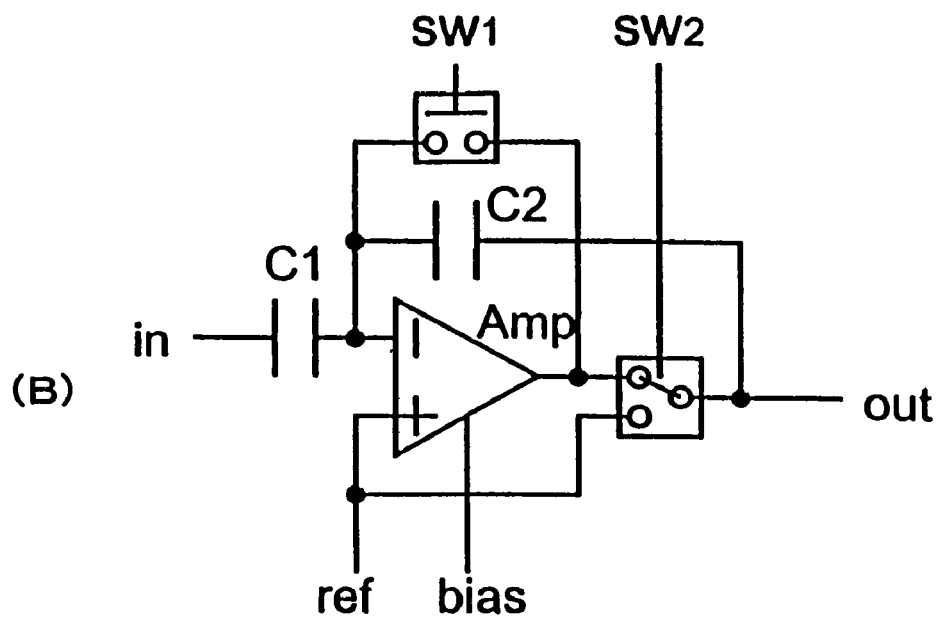
Figure 20:
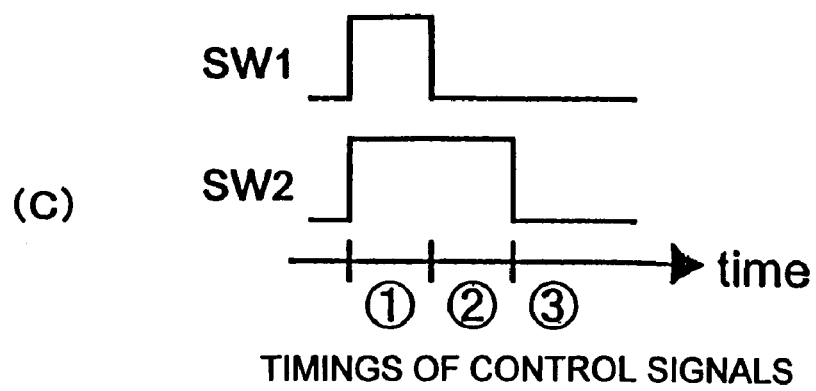

Shown in FIG. 20 are examples of the circuit diagram of a noise compensation buffer and the timing chart of control signals.

A noise compensation buffer circuit is a circuit in which circuit noise ascribable to the dispersion of elements is stored in a built-in capacitance, thereby to compensate for the circuit noise (refer to T. Sibano, K. Iizuka, M. Miyamoto, M. Osaka, R. Miyama and A. Kito: "Matched Filter for DS-CDMA of up to 50 MChip/s Based on Sampled Analog Signal Processing", ISSCC Digest of Tech. Papers, pp. 100-101, February 1997).

Operations will be described in conjunction with the timing chart of control signals in the figure.

[1] (SW1: ON, SW2: connected to ref)

On this occasion, input $V(in)=Vin0+VN0$ (here, Vin0: initial value of an input signal from a circuit at a preceding stage, VN0: circuit noise of the preceding stage)

Voltage of the inverting node of an AMP, $$V(in-)=V(ref)+Voff$$

(here, Voff: offset voltage of the AMP)

Charges accumulated in the inverting node of the AMP, $$Q=C1(V(\text{ref})+V\text{off}-Vin0-VN0)+C2(V(\text{ref})+V\text{off}-V(\text{ref})) \quad (3)$$

[2] (SW1: OFF, SW2: connected to ref)

On this occasion, the inverting node of the AMP falls into a floating state, and the charges are held as they are. (An operation till here is called the "reset operation".)

[3] (SW1: OFF, SW2: connected to the output of the AMP)

On this occasion, the input changes to $V(in)=Vin1+VN1$ (here, Vin1: input signal from the circuit at the preceding stage, VN1: circuit noise of the preceding stage at the input of the signal Vin1)

Charges accumulated in the inverting node of the AMP, $$Q=C1(V(\text{ref})+V\text{off}-Vin-VN1)+C2(V(\text{ref})+V\text{off}-V(\text{out})) \quad (4)$$

From Eqs. (3) and (4), $$V(\text{out})=-(C1/C2)(Vin1-Vin0+VN1-VN0)+V(\text{ref})$$

Accordingly, if the circuit noise in the preceding-stage circuit is constant (VN0=VN1), the output V(out) is free from the influence of, not only the offset of the AMP of the compensation buffer circuit itself, but also the circuit noise of the preceding stage, and it becomes proportional to the variation of the input voltage.

Incidentally, the operating region of the noise compensation buffer circuit depends upon the operating region of the AMP employed. The operating regions for the respective AMPs used are as follows:

Transconductance amplifier (AMP1): Operating for the minus change of the input

Transconductance amplifier (AMP2): Operating for the plus change of the input

Figure 21:
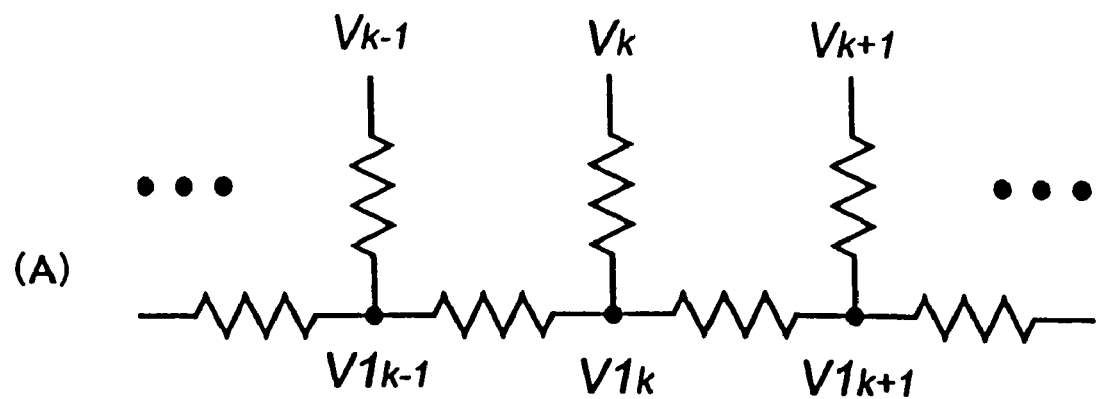
FIG. 21 shows a circuit diagram and an explanatory diagram of a resistance network.
Figure 21:
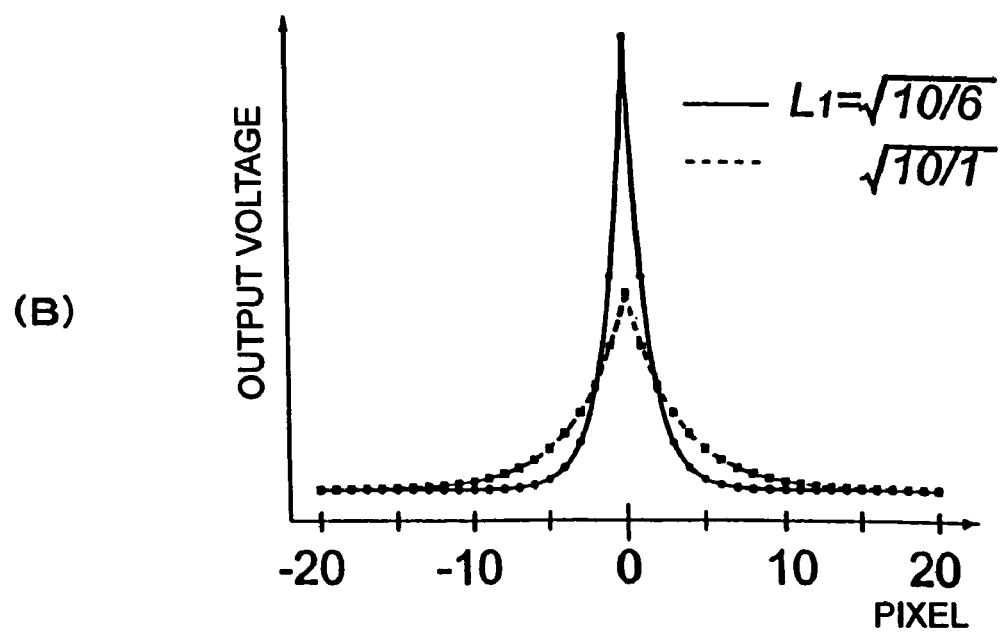
Figure 22:
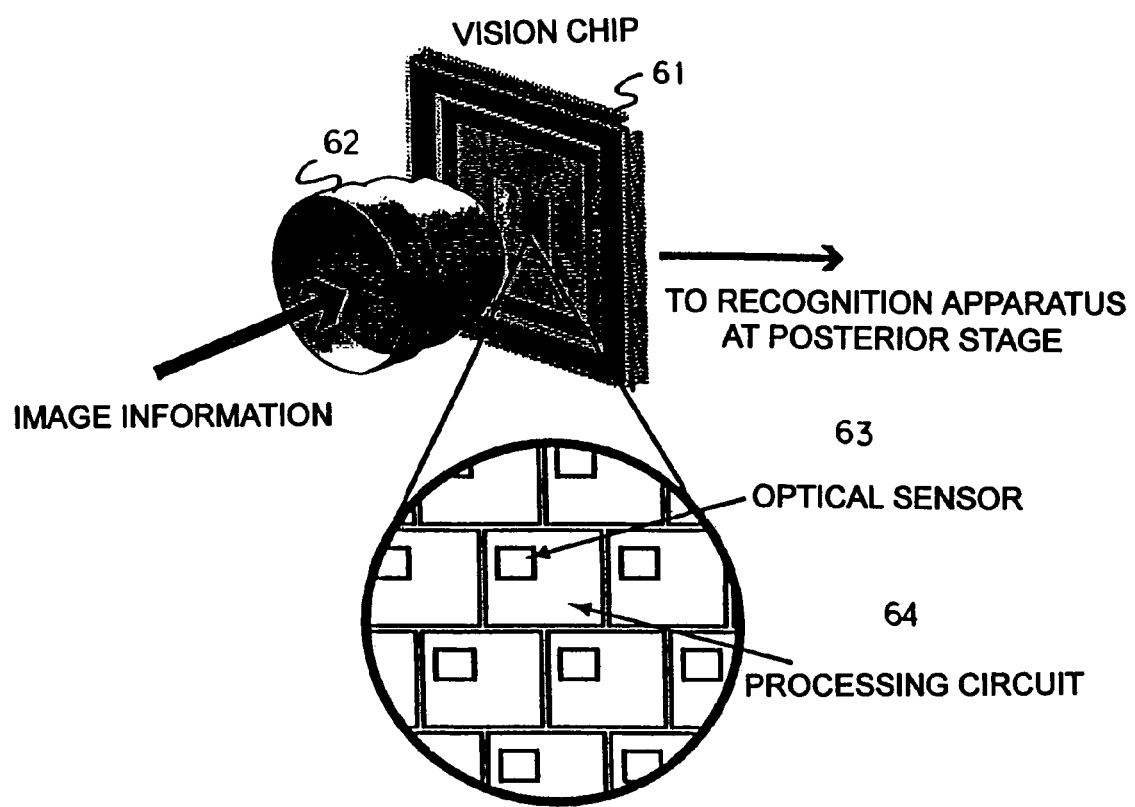
FIG. 22 is a schematic constructional view of a vision chip.
Figure 23:
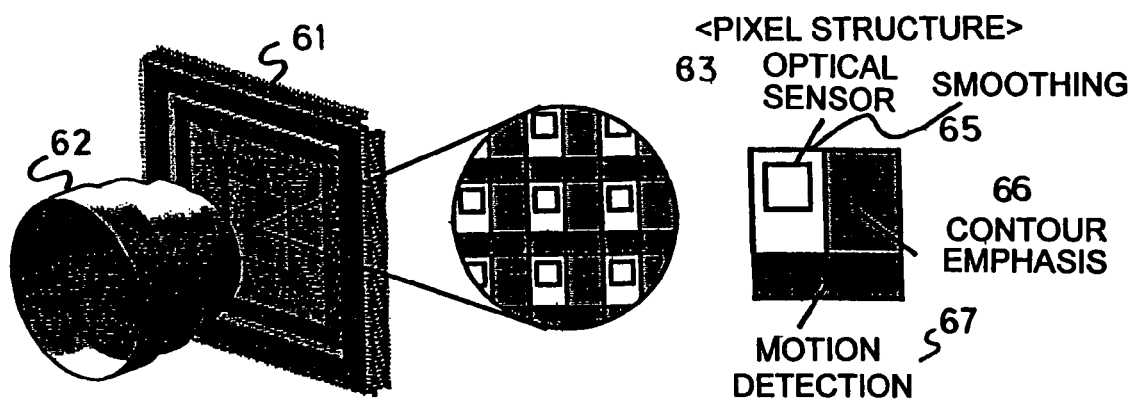
FIG. 23 is a circuit arrangement view of a single-chip system.

Wide-range amplifier: Operating for both the plus and minus changes of the input Shown in FIG. 21 are the circuit diagram and explanatory diagram of a resistance network.

Super-parallel image calculations based on the resistance network will be described with reference to this figure (refer to C. Mead: "Analog VLSI and Neural Systems", Addision-Wesley, Reading, Mass., 1989, and T. Yagi, S. Ohshima and Y. Funahashi: "The role of retinal bipolar cell in early vision: an implication with analogue networks and regularization theory", Biol. Cybem, 77, pp. 163-171, 1997). The distribution of the output voltages of the resistance network becomes the input voltages thereof as smoothed. In a case where the number of nodes is sufficiently large, the voltage distribution in the resistance network can be considered as stated below.

The voltage distribution will be explained in conjunction with the schematic diagram of the resistance network in Diagram (A).

It is assumed that the input voltage at k=0 be Vk=V0, and that the other input voltages be zero (spatial impulse input). The response potential Vlk of the resistance network to this input becomes:

$$Vlk=B1 Vo\gamma1^{|k|} \quad \text{Equation 1}$$

Here, $B1=1/\sqrt{4L1^2+1}$, $L1=\sqrt{Rm/Rs}$ $\gamma1=1+1/(2L1^2)-\sqrt{1/L1^2+1/(4L1^4)}$ This equation represents that the output signal attenuates exponentially with a distance from the signal source (k=0).

Besides, L1 is called the "spatial constant of the resistance network", and the signal propagates more extensively as the numerical value of the spatial constant L1 is larger.

Shown in Diagram (B) are results obtained in such a way that the output voltage distribution at the spatial impulse input was computed for two sorts of spatial constants. A solid line corresponds to $L1=\sqrt{(10/6)}$, while a broken line corresponds to $\sqrt{(10/1)}$. Both the results smoothly attenuate exponentially with the distance from the signal source. It is also understood that the output propagates more extensively in the broken line of the larger spatial constant.

A response to any desired input potential distribution Vi is expressed by the spatial convolution integral of a response in the case of putting Vk=1 in Equation 1 and the distribution Vi, as follows:

$$V_{1k} = B_1 \sum_{i=-\infty}^{\infty} V_i \gamma_1^{|k-i|}$$

That is, in case of utilizing the resistance network as a constituent circuit for image processing, it can execute the smoothing processing of an input image at high speed in super-parallel fashion by arraying optical sensors or pixel memories in an input portion, and it can freely regulate a region to-be-smoothed by constructing resistance elements out of variable resistances.

INDUSTRIAL APPLICABILITY

As described above, the present invention adopts the construction of a so-called "multi-chip system" in which processing intended to be executed by one chip is divided and performed by a plurality of chips, whereby the various processing steps of image processing or the like are performed by a super-parallel circuit structure, and they can be executed in real time. Moreover, according to the present invention, a system of low price, small size and low dissipation power, which utilizes CMOS by way of example can be provided. Furthermore, according to the present invention, a system which has robustness peculiar to analog devices can be provided.

Although embodiments of the invention have been shown and described, it is to be understood that various modifications and substitutions, as well as rearrangements of components parts and circuits, can be made by those skilled in the art without departing from the novel spirit and scope of the invention.

What is claimed is:

1. An image sensing apparatus, comprising:
   first pixel circuits each of which includes an optical sensor that converts an inputted light signal into an electric signal, and a first processing circuit that executes first analog processing for the output from the optical sensor and outputs analog image information; and
   second pixel circuits each of which includes a second analog memory that receives the analog image information from the first processing circuit of said first pixel circuit and stores the received analog image information, and a second processing circuit that reads out the image information from the second analog memory, executes second analog processing and outputs analog image information, and which is disposed in correspondence with said first pixel circuit,
   wherein the first and second pixel circuits being respectively arranged in matrix shapes so as to form first and second chips, and one of the first and second processing circuits respectively receiving analog signals from the other of the first and second processing circuits which are near the one of the fist and second processing circuits, in the first and second chips corresponding thereto, so as to compensate for characteristics and to execute the first and second analog processing by parallel calculations;
   further comprising third pixel circuits each of which includes a third analog memory that receives the analog image information from the second processing circuit of said pixel circuit and stores the received analog image information, and a third processing circuit that reads out the image information from the third analog memory, executes third analog processing and outputs analog image information, and which is disposed in correspondence with said first and second pixel circuits; wherein the third pixel circuits being arranged in a matrix shape so as to form a third chip, and one of the third processing circuits respectively receiving analog signals from the other of the third processing circuits, which is near the one of the third processing circuit, in the third chip so as to compensate for characteristics and to execute the third analog processing by parallel calculations,
   wherein, a chip for left eye and a chip for a right eye, each of which includes the first chip that executes image acquisition and smoothing processing, the second chip that executes contour emphasis processing for an output of said first chip, and the third chip that executes motion detection processing, and which execute image processing corresponding to the left eye and the right eye, respectively;
   a fourth chip which executes processing for computing parallax, for outputs from the second chips corresponding to the left eye and the right eye; and
   a binding portion which binds outputs of the first to fourth chips.

2. An image sensing apparatus as defined in claim 1, characterized in:
   that the first chip executes image acquisition and smoothing processing for acquired image information;
   that the second chip executes contour emphasis processing for image information from said first chip; and
   that the third chip executes motion detection processing for image information from said second chip.

3. An image sense apparatus as defined in claim 1, wherein the first chip further comprises:
   a horizontal shift register and a vertical shift register which sequentially select the first pixel circuits and read out outputs calculated in parallel;
   switches each of which selects the analog output from any of said first pixel circuits; and
   an outputting buffer for the analog output selected by said each switch.

4. An image sensing apparatus as defined in claim 1, wherein the second chip further comprises;
   a horizontal shift register ad a vertical shift register which sequentially select the second pixel circuits and read out outputs calculated in parallel;
   switches each of which selects the analog output from any of said second pixel circuits;
   an outputting buffer which temporarily accumulates the analog output selected by said each switch; and
   an inputting buffer for the analog input to said each second pixel circuit.

5. An image sensing apparatus as defined in 1, wherein in said first pixel circuit:
the optical sensor includes an active pixel sensor which converts the light signal into the electric signal in accordance with a control signal; and
the first processing circuit includes:
a resistance network which receives an analog signal from the active pixel sensor of said first pixel circuit of its own, and analog signals from the nearby first pixel circuits, so as to smooth an analog input image from said active pixel sensor;
a noise compensation buffer circuit which receives an analog signal from the resistance network and performs an analog calculation, so as to compensate for a dispersion of circuit element characteristics on an input side and an offset of an internal amplifier in accordance with control signals, thereby to compensate for circuit noise; and
a switch for outputting an analog signal from the noise compensation buffer circuit;
wherein said first pixel circuit performs acquisition of an image signal and smoothing processing.

6. An image sensing apparatus as defined in claim 1, wherein:
said second pixel circuit further includes a first switch which controls input of a pixel signal from said first pixel circuit;
the second analog memory stores an analog image in an internal capacitor; and
the second processing circuit includes:
a resistance network which receives an analog signal from the second analog memory of said second pixel circuit of its own, and analog signals from the nearby second pixel circuits, so as to smooth an analog input image from said second analog memory;
a noise compensation buffer circuit which receives analog signals of the input and output of the resistance network as changed-over in accordance with control signals and performs an analog calculation, so as to compensate for a dispersion of circuit element characteristics on an input side and an offset of an internal amplifier, thereby to compensate for circuit noise; and
a switch for outputting an analog signal from the noise compensation buffer circuit;
wherein said second pixel circuit performs contour emphasis processing.

7. An image sensing apparatus as defined in 1, wherein:
said third pixel circuit further includes a first switch which controls the reception of a pixel signal from said second pixel circuit;
the third analog memory stores an analog image in an internal capacitor; and
the third processing circuit includes:
a noise compensation buffer circuit which reads out image information from the analog memory and outputs an analog signal proportional to a difference between the current image information and the last image information, in accordance with control signals, and which compensates for a dispersion of circuit element characteristics on an input side and an offset of an internal amplifier, thereby to compensate for circuit noise; and
a second switch for outputting the analog signal from the noise compensation buffer circuit;
wherein said third pixel circuit performs motion detection processing.

* * * * *